US010408698B2

(12) United States Patent
Waldman

(10) Patent No.: US 10,408,698 B2
(45) Date of Patent: Sep. 10, 2019

(54) ELECTRONIC FORCE DYNAMOMETER AND CONTROL SYSTEM

(71) Applicant: Barrett Productions, LLC, Newton, MA (US)

(72) Inventor: Dennis Waldman, Newton, MA (US)

(73) Assignee: Barrett Productions, LLC, Newton, MA (US)

( * ) Notice: Subject to any disclaimer, the term of this patent is extended or adjusted under 35 U.S.C. 154(b) by 0 days.

(21) Appl. No.: 15/916,501

(22) Filed: Mar. 9, 2018

(65) Prior Publication Data

US 2018/0259406 A1    Sep. 13, 2018

Related U.S. Application Data

(60) Provisional application No. 62/469,196, filed on Mar. 9, 2017.

(51) Int. Cl.
```
G01L 5/00        (2006.01)
G01L 5/10        (2006.01)
G01L 5/04        (2006.01)
G01L 1/16        (2006.01)
```

(52) U.S. Cl.
CPC .............. G01L 5/101 (2013.01); G01L 1/16 (2013.01); G01L 5/0047 (2013.01); G01L 5/047 (2013.01)

(58) Field of Classification Search
CPC ......... G01L 5/101; G01L 1/16; G01L 5/0047; G01L 5/047
USPC ....................................... 73/862.51
See application file for complete search history.

(56) References Cited

U.S. PATENT DOCUMENTS

| | | | | |
|---|---|---|---|---|
| 2001/0033316 A1* | 10/2001 | Eida | ..................... | B41J 2/17509 347/86 |
| 2003/0163287 A1* | 8/2003 | Vock | ................... | A43B 3/0005 702/187 |
| 2004/0267331 A1* | 12/2004 | Koeneman | ............... | A61H 1/02 607/49 |
| 2013/0342501 A1* | 12/2013 | Molne et al. | ......... | G06F 3/0414 345/174 |

OTHER PUBLICATIONS

"Guide to the Measurement of Force", The Institute of Measurement and Control; ISBN 0904457281; 51 pages; 2013.
(Continued)

*Primary Examiner* — Max H Noori
(74) *Attorney, Agent, or Firm* — Carter, DeLuca & Farrell LLP

(57) ABSTRACT

A force dynamometer includes at least one plate, a controller with a memory and at least one force sensing resistor that senses a force exerted on the one or more plates. The controller receives a signal indicating magnitude of the force and transmits a signal to at least one color variable light emitting diode (LED) to change color of the color variable LED in response to the force sensing resistor changing magnitude of the force signal transmitted to the controller. The controller may transmit a signal to one or more piezoelectric sensors such that the controller controls intensity of vibrations and/or magnitude of frequency of the vibrations of the one or more piezoelectric sensors. A force dynamometer system includes a computing device that displays or controls speed of a variable motion speed image or object or displays or controls a direction controllable image or object via the force dynamometer.

8 Claims, 16 Drawing Sheets

(56) References Cited

OTHER PUBLICATIONS amazon.com: "LED Water Faucet Stream Light 7 Colors Changing Glow Shower Tap Head Kitchen Pressure Sensor Kitchen Accessory";<https://www.amazon.com/Faucet-Changing-Kitchen-Pressure-Accessory/dp/B01M7MR0U1>; 6 pages; Jul. 2018.
amazon.com: "Vibration, LED Color Changing LED Lighted Metal Wall Art Modern Abstract Sculpture Painting Decor RGB: Home & Kitchen"; https://www.amazon.com/Vibration-LED-Changing-Abstract-Sculpture/dp/B00DCHG7S2; 4 pages; Jul. 2018.

* cited by examiner

ELECTRONIC FORCE DYNAMOMETER AND CONTROL SYSTEM

CROSS-REFERENCE TO RELATED APPLICATIONS

This application claims the benefit of, and priority to, U.S. Provisional Patent Application No. 62/469,196 by Dennis Waldman filed on Mar. 9, 2017 entitled "ELECTRONIC COMPRESSION SENSOR AND CONTROLLER", the entire contents of which are incorporated herein by reference.

BACKGROUND

Inch force dynamometers to measure pinch strength are known in the art. Most use hydraulics and some use electronics and may involve wireless communication. However, such dynamometers have a limited scope of usage merely displaying a single data point of pinch force at a time and thus are not substantially useful for applications such as for rehabilitation or therapeutic purposes.

SUMMARY

The present disclosure relates to a significantly advantageous and unobvious force dynamometer and force dynamometer system that provide significantly greater applications for usage including control of the color of color variable light emitting diodes (LEDs) and processors that control and display video games or training simulators or viewer-interactive motion pictures (e.g., virtual reality or augmented reality) or virtual musical instruments or that control mobile objects such as drones, robots, lawn mowers marine vehicles, toys, etc.

More particularly, the force dynamometer according to the present disclosure includes at least one plate, a printed circuit board or controller that includes a memory storing instructions, and at least one force sensing resistor that is mounted in operable association with the one or more plates and in electrical communication with the printed circuit board or controller such that the one or more force sensing resistors senses a force exerted on the one or more plates. The printed circuit board or controller receives a signal from the one or more force sensing resistors indicating magnitude of the force sensed by the one or more force sensing resistors. The printed circuit board or controller transmits a signal to at least one color variable light emitting diode (LED) that is in electrical communication with the one or more force sensing resistors and in electrical communication with the printed circuit board or controller to receive the force signal therefrom to change color of the one or more color variable LEDs in response to the one or more force sensing resistors changing magnitude of the force signal transmitted to the printed circuit board or controller.

Alternatively, or additionally, in an aspect of the present disclosure, the printed circuit board or controller transmits a signal to one or more piezoelectric sensors in electrical communication with the one or more force sensing resistors via the printed circuit board or controller such that the printed circuit board or controller controls intensity of vibrations and/or frequency of the vibrations of the one or more piezoelectric sensors. Thereby, various combinations of controlling by the printed circuit board or controller of the one or more LEDs and the one or more piezoelectric sensors are possible.

In an aspect of the present disclosure, wherein the one or more color variable light emitting diodes (LED) is in electrical communication with the one or more piezoelectric sensors, upon the printed circuit board or controller sensing a force signal transmitted from the one or more piezoelectric sensors, the printed circuit board or controller causes the one or more piezoelectric sensors to change one of vibration intensity or vibration frequency or combinations of vibration intensity and vibration frequency and the the printed circuit board or controller causes the one or more color variable LEDs to change color in response to the one or more piezoelectric sensors changing one of vibration intensity or vibration frequency or combinations of vibration intensity and vibration frequency.

In an aspect, at least one of the plate is flexible.

In an aspect, the at least one plate includes a first plate and a second plate and the at least one force sensing resistor is mounted beneath the first plate and the second plate.

In an aspect, the force dynamometer includes a supporting structure and an enclosure configured with a channel, wherein the at least one plate I includes at least two plates supported by the supporting structure, and one of the at least two plates is configured with a channel, wherein the channel configured in the one of the at least two plates and the channel configured in the enclosure enable positioning by a user of the force dynamometer of a finger in one of the channels and a thumb in the other of the channels such that the user can move the finger and thumb towards one another to exert force on the force sensitive resistor.

In an aspect, the force dynamometer includes a liquid crystal display (LCD) in electrical communication with the controller, wherein upon the at least one force sensing resistor sensing a force, the controller transmits a signal to the LCD to display a magnitude of the force sensed by the at least one force sensing resistor.

In an aspect, the controller is configured to transmit the pressure or force data point as one in a sequence of a plurality of pressure or force data points to a processor capable of storing and displaying the plurality of pressure or force data points.

In an aspect, the channels are each configured as U-shaped channels thereby enabling positioning by a user of the force dynamometer of a finger and a thumb each in a respective U-shaped channel such that the user can move the finger and thumb to towards one another to exert force on the force sensitive resistor.

The present disclosure relates also to a force dynamometer system that includes a computing device including at least one processor and a memory storing instructions which, when executed by the at least one processor, causes the computing device to: display a variable motion speed image or object or to control speed of a variable motion speed controllable image or object, or to display a direction controllable image or object or to control a direction controllable image or object, or to display combinations of a variable motion speed image or object and a direction controllable image or object or to control a direction controllable image or object; and a force dynamometer including: at least one plate; a controller, the controller including an inertial measurement unit; and at least one force sensing resistor mounted in operable association with the at least one plate and in electrical communication with the controller and the inertial measurement unit such that the at least one force sensing resistor senses a force exerted on the at least one plate; wherein upon the controller sensing a force signal transmitted from the at least one force sensing resistor and the inertial measurement unit sensing via the inertial measurement unit movement of a variable motion speed image or object, or direction of a direction controllable image or object, or combinations of movement of a variable motion speed image or object and a direction of a direction controllable image or object, upon a user increasing or decreasing force applied to the force dynamometer, the controller transmits a signal to the processor to vary speed of the variable motion speed image or object or to vary direction of the direction controllable image or object, or a combination of varying speed of the variable motion speed image or object or varying direction of the direction controllable image or object, or upon a user varying orientation of the force dynamometer, the controller transmits a signal to the processor to vary orientation of the direction controllable image or object.

In an aspect, the image is an image of a video entertainment display.

In an aspect, the direction of the direction controllable image includes altitude or angular orientation or combinations of altitude and angular orientation.

In an aspect, the object is a vehicle or a drone. Additionally, the object may be an aerial vehicle or an aerial drone.

In an aspect, the direction of the direction controllable object includes altitude or angular orientation or combinations of altitude and angular orientation.

In an aspect, the system includes at least one color variable light emitting diode (LED) in electrical communication with the at least one force sensing resistor to receive a force signal therefrom, wherein the at least one color variable LED changes color in response to the at least one force sensing resistor changing magnitude of the force signal transmitted to the at least one LED.

In an aspect, the system includes at least one color variable light emitting diode (LED) in electrical communication with the processor via the controller, wherein upon the processor transmitting a signal to the controller that speed of the variable motion speed controllable image or object has varied or that direction of the direction controllable image or object has varied or combinations of the speed of the variable motion speed controllable image or object has varied and that direction of the direction controllable image or object has varied, the processor transmits a signal via the controller to the at least one LED to vary color.

In an aspect, the system includes upon the processor transmitting a signal to the controller that speed of the variable motion speed controllable image or object has varied or that direction of the direction controllable image or object has varied or combinations of the speed of the variable motion speed controllable image or object has varied and that direction of the direction controllable image or object has varied, the processor transmits a signal via the controller to increase or decrease force sensed by a user of the force dynamometer via the at least one force sensing resistor.

In an aspect, the force dynamometer includes at least one piezoelectric sensor in operable association with the at least one plate and in electrical communication with the at least one force sensing resistor, wherein upon the processor transmitting a signal to the controller that speed of the variable motion speed controllable image or object has varied or that direction of the direction controllable image or object has varied or combinations of the speed of the variable motion speed controllable image or object has varied and that direction of the direction controllable image or object has varied, the processor transmits a signal via the controller to change one of vibration intensity or vibration frequency or combinations of vibration intensity and vibration frequency sensed by a user of the force dynamometer via the at least one piezoelectric sensor.

In an aspect, the force dynamometer includes at least one piezoelectric sensor mounted between the at least one plate and in electrical communication with the at least one force sensing resistor, wherein upon the at least one piezoelectric sensor sensing a force signal transmitted from the at least one force sensing resistor, the at least one piezoelectric sensor changes one of vibration intensity or vibration frequency or combinations of vibration intensity and vibration frequency and wherein the at least one color variable LED changes color in response to the at least one piezoelectric sensor changing one of vibration intensity or vibration frequency or combinations of vibration intensity and vibration frequency.

In an aspect, the force dynamometer includes at least one piezoelectric sensor in operable association with the at least one plate and in electrical communication with the at least one force sensing resistor, wherein upon the at least one piezoelectric sensor sensing a force signal transmitted from the at least one force sensing resistor, the at least one piezoelectric sensor changes one of vibration intensity or vibration frequency or combinations of vibration intensity and vibration frequency and wherein upon the controller sensing a change in one of vibration intensity or vibration frequency or combinations of vibration intensity and vibration frequency and the inertial measurement unit sensing via the inertial measurement unit movement of a variable motion speed image or object, or direction of a direction controllable image or object, or combinations of movement of a variable motion speed image or object and a direction of a direction controllable image or object, upon a user increasing or decreasing force applied to the force dynamometer, the controller transmits a signal to the processor to vary speed of the variable motion speed image or object or to vary direction of the direction controllable image or object, or a combination of varying speed of the variable motion speed image or object or varying direction of the direction controllable image or object, or upon a user varying orientation of the force dynamometer, the controller transmits a signal to the processor to vary orientation of the direction controllable image or object.

BRIEF DESCRIPTION OF THE DRAWINGS

The advantages and features of the present disclosure will become more appreciated and better understood when considered in conjunction with the drawings:

FIG. 1A is a top front perspective view of a force dynamometer according to aspects of the present disclosure;

FIG. 1B is a top rear perspective view of the force dynamometer of FIG. 1A;

FIG. 1C is a rear perspective view of the force dynamometer in an inverted orientation;

FIG. 1D is a bottom front perspective view the of the force dynamometer;

DETAILED DESCRIPTION

Figure 1A:
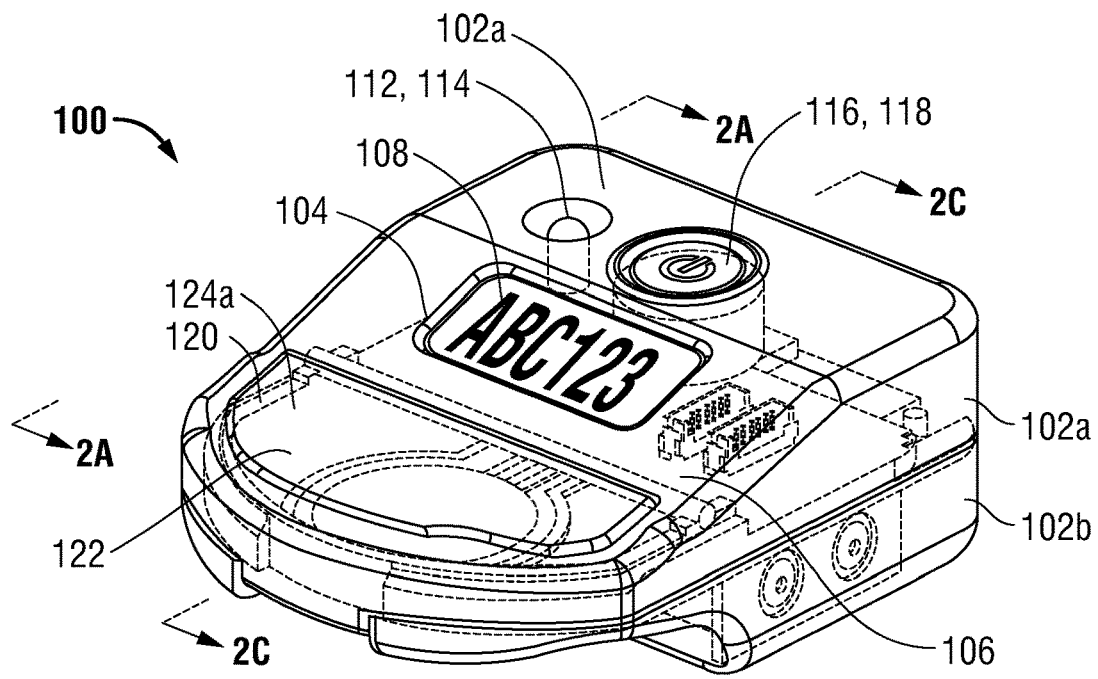
FIGS. 1A-1D illustrate a force dynamometer according to aspects of the present disclosure.

To address deficiencies in the prior art, the present disclosure relates to an electronic device or force dynamometer that can be pinched between fingers and detect pinch force that provides significant and non-obvious advantages over the prior art by, in addition to showing pinch force, including at least one light-emitting diode (LED) light that changes to a color that is related to a certain force. As the user pinches with greater force, the LED light will change colors.

In addition, unlike prior art force dynamometers, the force dynamometer according to the present disclosure includes at least one piezoelectric vibrator that indicates pinch force by changing intensity and/or frequency as the force changes. For example, the vibration will increase as the user pinches with greater force, or the vibration changes frequency as the user pinches with greater force (the stronger the pinch, the faster the vibration) or both. These features are user selectable through a mobile device.

The signal representing the force intensity is capable of being transmitted to a mobile device through wireless protocols such as BlueTooth.

Additionally, and also unlike prior art force dynamometers, the electronics of the force dynamometer according to the present disclosure includes accelerometers, gyroscopes and magnetometers to determine movement (6-Axis or 9-Axis micro electro-mechanical systems (MEMS)). This allow the force dynamometer to be used as a controller in a force dynamometer system for recording and displaying force, pressure and torque applied by the user or to control video games or objects such as aerial or ground-based drones or robots or virtual musical instruments as non-limiting examples.

The portion of the force dynamometer where the user compresses the force dynamometer is designed for comfortable presses of the three most common pinches that are tested: 2-Point Pinch, 3-Point Pinch, and Side Pinch.

The compression applied by the user's fingers forces the compression to apply directly into a force sensing resistor (FSR) rather than being slightly absorbed by a living hinge within the system. The locations where the user's fingers are applied are symmetrical with respect to the top and the bottom of the force dynamometer.

With a Bluetooth transmitter that is included, exact force information is available to a mobile device as part of a force dynamometer system. The system enables storing the user information and tracking improvement in strength, which is very useful for rehabilitation.

This same force information can be used to control a device in a game in another aspect of the force dynamometer system. For example, in a drag racing game, the harder the user squeezes the force dynamometer, the faster the car travels. This can be used similarly for any such game like horse racing or motorcycle racing. Furthermore, there can be multiple players to create an attractive creative play environment.

The inclusion of MEMS information to determine rotational movement, and then transmission of that information to a smart mobile device enables the force dynamometer to be used to play such games that additionally require steering.

Detecting all rotational movement through the MEMS enables the force dynamometer system to become a drone controller. Leaning the hand forward causes the force dynamometer to lean forward so as to move the drone forward.

Leaning the hand backwards causes the force dynamometer to lean backwards so as to move the drone backwards. Pitching the drone to the left and to the right can be accomplished by tilting the force dynamometer to the left and to the right. The greater force exerted by the user, the higher the drone can travel vertically upward.

The force dynamometer and system can also be used as a musical instrument digital interface (MIDI) controller. MIDI is the standard protocol used by music synthesizers. With modifications, the force dynamometer system may also broadcast MIDI signals thru BlueTooth. There are many mobile apps that can utilize these signals to produce musical sounds. For example, the user can play a virtual piano. Compressing the force dynamometer plays the note and allows the MIDI to measure the velocity in which the note was played (how loud). Moving the force dynamometer to the left and right allow splaying different notes of the virtual piano and rotating the hand can "bend" the note, i.e., change the pitch of the note.

The force dynamometer system can also play other stringed instruments such as a harp or other instruments such as a drum.

In view of the foregoing, the specification and in the accompanying drawings, reference is made to particular features (including method steps or acts) of the present disclosure. It is to be understood that the disclosure in this specification includes combinations of parts, features, or aspects disclosed herein. For example, where a particular feature is disclosed in the context of a particular aspect or embodiment of the present disclosure, or a particular claim, that feature can also be used, to the extent possible, in combination with and/or in the context of other particular aspects and embodiments of the present disclosure, and in the disclosure generally.

Where reference is made herein to a method comprising two or more defined steps or acts, the defined steps or acts can be carried out in any order or simultaneously (except where the context excludes that possibility); and the method can include one or more other steps or acts which are carried out before any of the defined steps or acts, between two of the defined steps or acts, or after all the defined steps or acts (except where the context excludes that possibility).

The term "application" in the disclosed embodiments refers to at least a program designed for end users of a computing device, such as a word processing program, a database program, a browser program, a spreadsheet program, a gaming program, and the like. An application is distinct from systems programs, which consist of low-level programs that interact with the computing device at a very basic level, such as an operating system program, a compiler program, a debugger program, programs for managing computer resources, and the like.

The term "module" may refer to a self-contained component (unit or item) that is used in combination with other components and/or a separate and distinct unit of hardware or software that may be used as a component in a system, such as a wireless or non-wireless communication system. The term "module" may also refer to a self-contained assembly of electronic components and circuitry, such as a stage in a computer that is installed as a unit.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, tablets, portable/personal digital assistants, and other devices that facilitate communication of information between end-users within a network.

The general features and aspects of the present disclosure remain generally consistent regardless of the particular purpose. Further, the features and aspects of the present disclosure may be implemented in system in any suitable fashion, e.g., via the hardware and software configuration of system or using any other suitable software, firmware, and/or hardware.

For instance, when implemented via executable instructions, various elements of the present disclosure are in essence the code defining the operations of such various elements. The executable instructions or code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media may include any medium that may store or transfer information.

The computer means or computing means or processing means may be operatively associated with the stereoscopic system, and is directed by software to compare the first output signal with a first control image and the second output signal with a second control image. The software further directs the computer to produce diagnostic output. Further, a means for transmitting the diagnostic output to an operator of the verification device is included. Thus, many applications of the present disclosure could be formulated. The exemplary network disclosed herein may include any system for exchanging data or transacting business, such as the Internet, an intranet, an extranet, WAN (wide area network), LAN (local area network), satellite communications, and/or the like. It is noted that the network may be implemented as other types of networks.

Additionally, "code" as used herein, or "program" as used herein, may be any plurality of binary values or any executable, interpreted or compiled code which may be used by a computer or execution device to perform a task. This code or program may be written in any one of several known computer languages. A "computer," as used herein, may mean any device which stores, processes, routes, manipulates, or performs like operation on data. A "computer" may be incorporated within one or more transponder recognition and collection systems or servers to operate one or more processors to run the transponder recognition algorithms. Moreover, computer-executable instructions include, for example, instructions and data which cause a general purpose computer, special purpose computer, or special purpose processing device to perform a certain function or group of functions. Computer-executable instructions also include program modules that may be executed by computers in stand-alone or network environments. Generally, program modules include routines, programs, objects, components, and data structures, etc., that perform particular tasks or implement particular abstract data types.

Figure 1B:
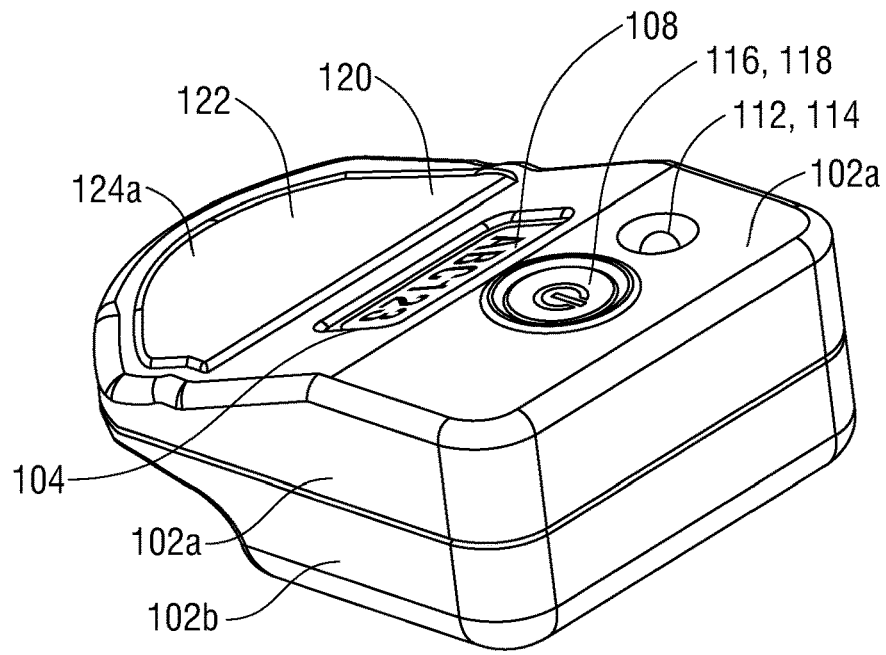
Figure 1C:
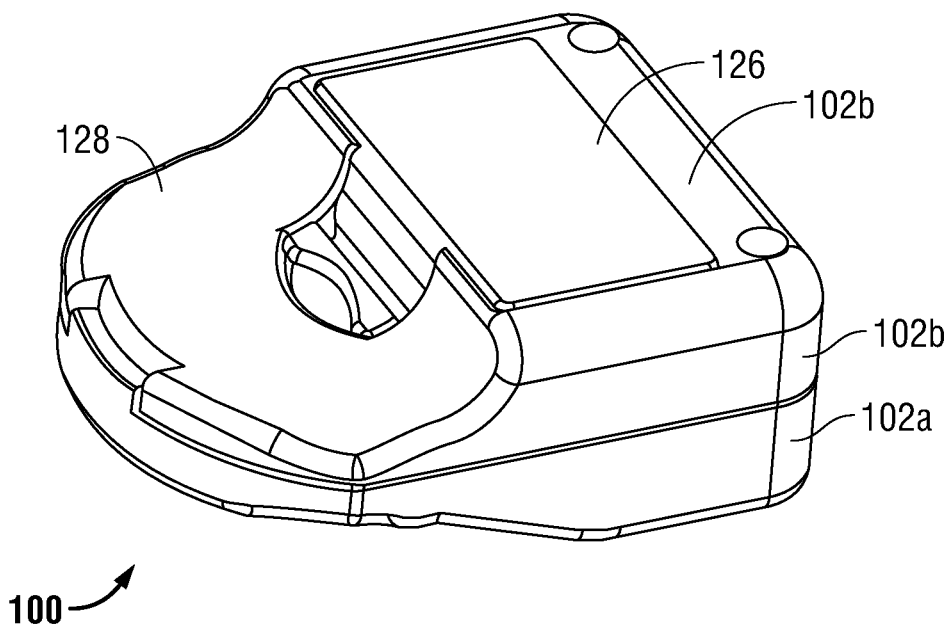

More particularly in view of the foregoing discussion, FIGS. 1A-1D illustrate a force dynamometer according to aspects of the present disclosure. More particularly, FIG. 1A is a top front perspective view of force dynamometer 100, FIG. 1B is a top rear perspective view of force dynamometer 100 and FIG. 1C is a rear perspective view of force dynamometer 100 in an inverted orientation wherein force dynamometer 100 includes a top cover or enclosure 102a and a bottom cover or enclosure 102b, each having as an example an arch-shaped profile that is configured to interface with the arch-shaped profile of the other. A display aperture 104 is defined by the top cover or enclosure 102a in a sloped surface 106 wherein a display 108 such as a liquid crystal display (LCD) may be received through the display aperture 104.

Top cover 102a further defines an optical aperture 112 passing through a surface 110 of the top cover 102a that extends via sloped surface 106 to an upper compression plate base surface 120 of the top cover 102a. The surface 110 of the top cover 102a is thus a raised surface with respect to upper compression plate base surface 120, the latter of which is in the form of a curved arch as an example while the surface 110 is generally rectangular or square as an example. The optical aperture 112 is configured to receive therethrough a color variable light emitting diode (LED) 114. Top cover 102a also defines a device operation aperture 116 that is configured to receive an operating switch or button 118.

The upper compression plate base surface 120 defines a first or upper compression plate aperture 122 that is configured to receive a first or upper compression plate 124a through the first or upper compression plate aperture 122.

Figure 1D:
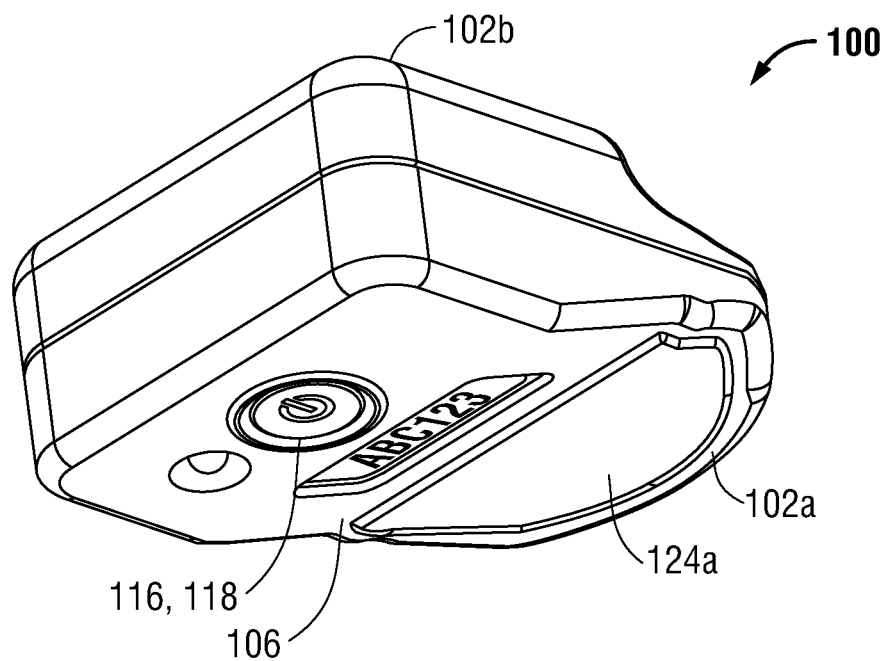

FIG. 1D illustrates a bottom front perspective view of force dynamometer 100 wherein bottom cover 102b includes a depressed surface 126 of bottom cover 102b and which, in the upright position of the force dynamometer 100, is lower than bottom cover base surface 128.

In contrast to upper compression plate base surface 120, bottom cover base surface 128 is an integral piece without defining an aperture for a second or lower compression plate. Further details of the construction and internal components of force dynamometer 100 are discussed below with respect to FIG. 4 and the exploded view of FIG. 5.

Figure 2A:
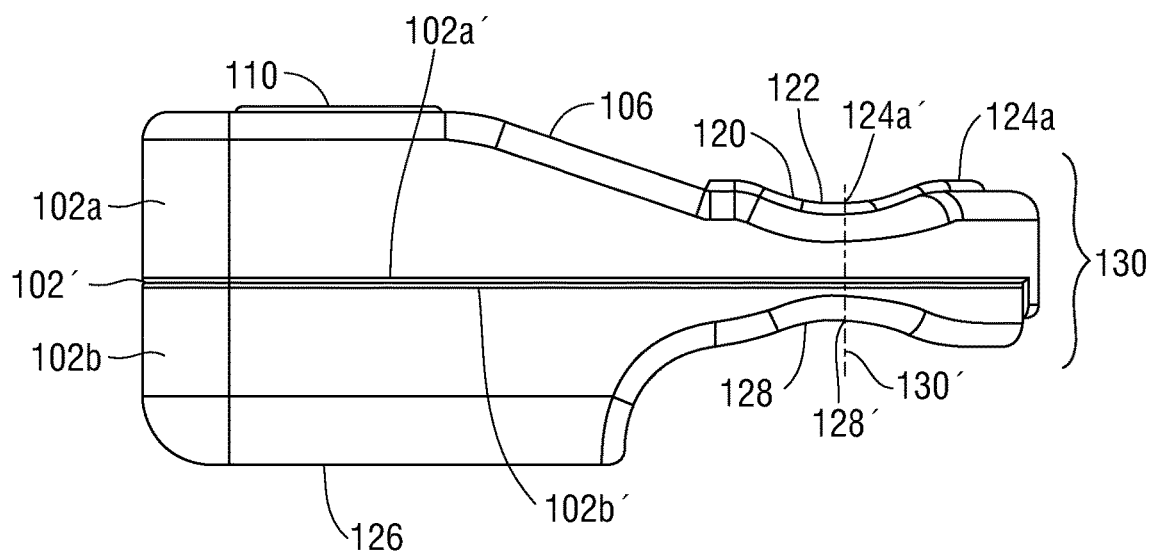
FIG. 2A is a left-side profile or elevation view, as taken along section line 2A-2A in FIG. 1A, of the force dynamometer illustrating a top cover or enclosure in direct contact with a bottom cover or enclosure.

FIG. 2A is a left-side profile or elevation view, as taken along section line 2A-2A in FIG. 1A, of the force dynamometer 100 illustrating the top cover or enclosure 102a in direct contact with bottom cover or enclosure 102b at interface 102' between top cover rim surface 102a' and bottom cover rim interface 102b' As indicated with respect to FIGS. 1A and 1B, the first or upper compression plate 124a is received through the first or upper compression plate aperture 122 and the first or upper compression plate 124a and the upper compression plate base surface 120 may both be configured with a curved or U-shaped profile to accommodate a finger of a user, such as an index finger, to be inserted in depression 124a' formed by the curved or U-shaped profile. Correspondingly, bottom cover base surface 128 also may be configured with a curved or U-shaped profile to accommodate a finger of a user, such as a thumb, to be inserted in depression 128' formed by the curved profile. As described below with respect to FIG. 4, a second or lower compression plate is enclosed within the bottom cover 102b and is configured to interface with the curved profile and depression 128' of the bottom cover base surface 128 to thereby accommodate the finger of the user, such as the thumb, to be inserted in depression 128'. Thereby, the depression 124a' and curved profile of the first or upper compression plate 124a and the depression 128' and the curved profile formed by the bottom cover base surface 128 are generally mirror images of one another and define a finger squeeze interface 130 having a center represented by dashed line 130' through the lowest point of depression 124a' and highest point of depression 128'.

Figure 2B:
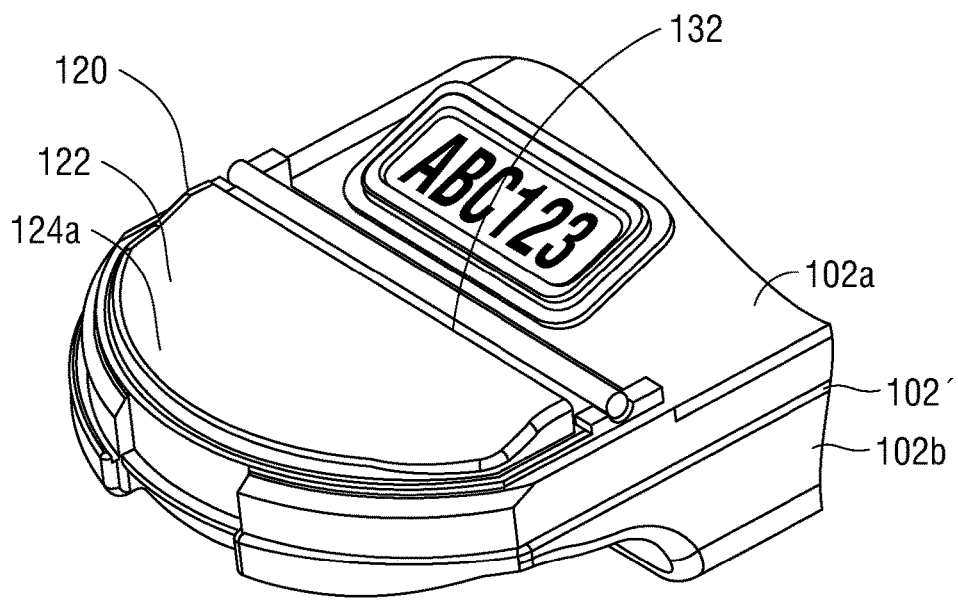
FIG. 2B is a detailed transparent view of an upper compression plate base surface for an upper compression plate of the force dynamometer.

FIG. 2B illustrates a detailed view of the upper compression plate base surface 120 wherein the first or upper compression plate 124a is received through the first or upper compression plate aperture 122.

Figure 2C:
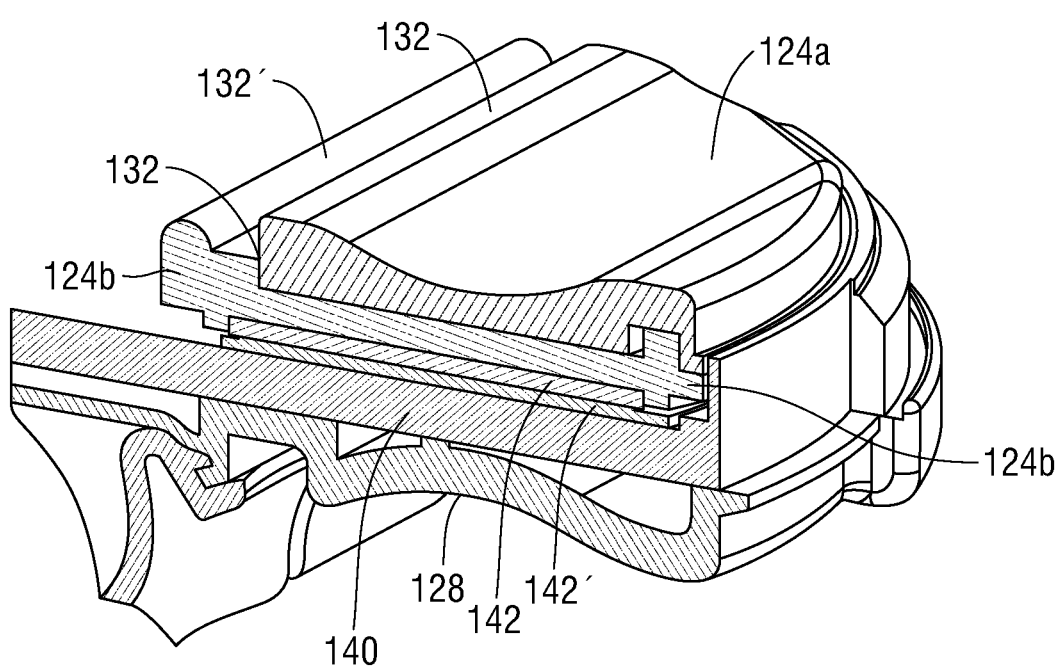
FIG. 2C is a partial cross-sectional view of the force dynamometer as taken along section line 2C-2C in FIG. 1A.

FIG. 2C is a partial cross-sectional view of the force dynamometer 100 as taken along section line 2C-2C in FIG. 1A.

Figure 4:
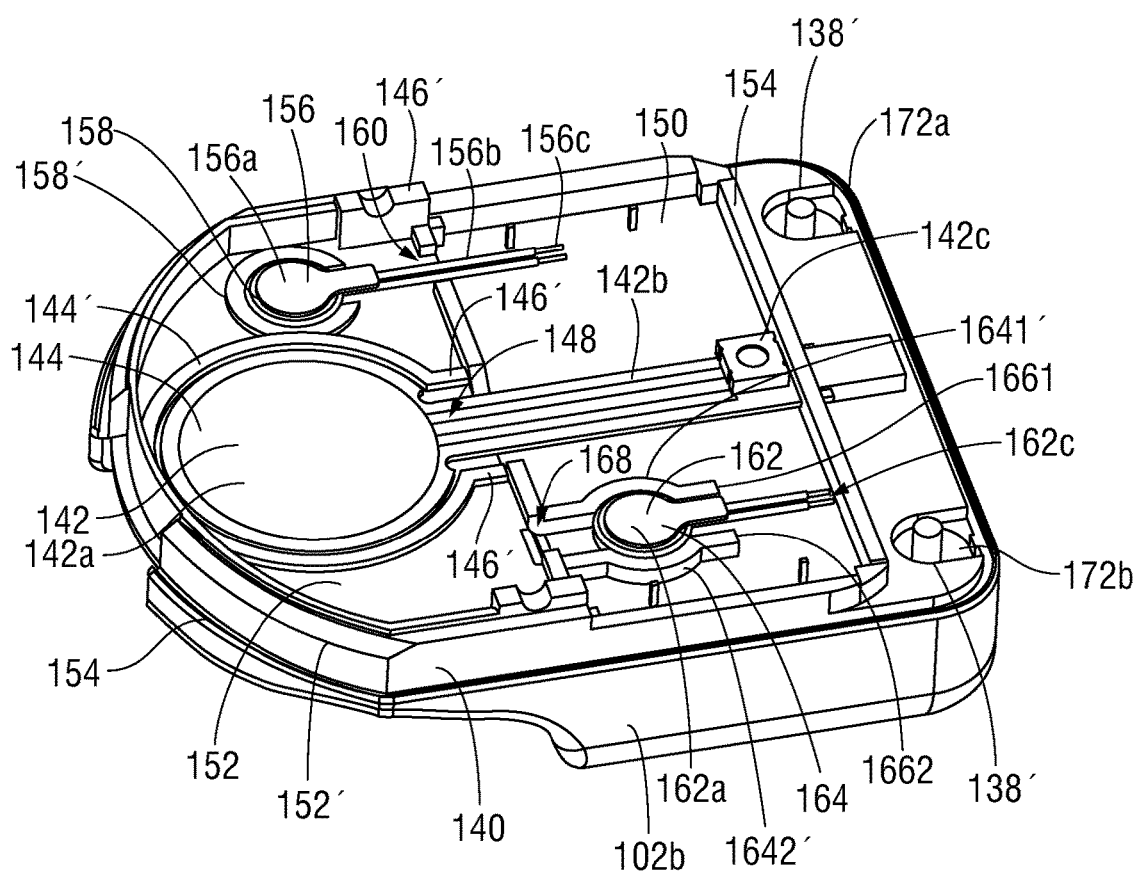
FIG. 4 is a top view of a supporting structure illustrated in FIGS. 2B and 2C having an arch-shaped profile to facilitate interfacing with the arch-shaped profiles of the top cover or enclosure and the bottom cover or enclosure.
Figure 5:
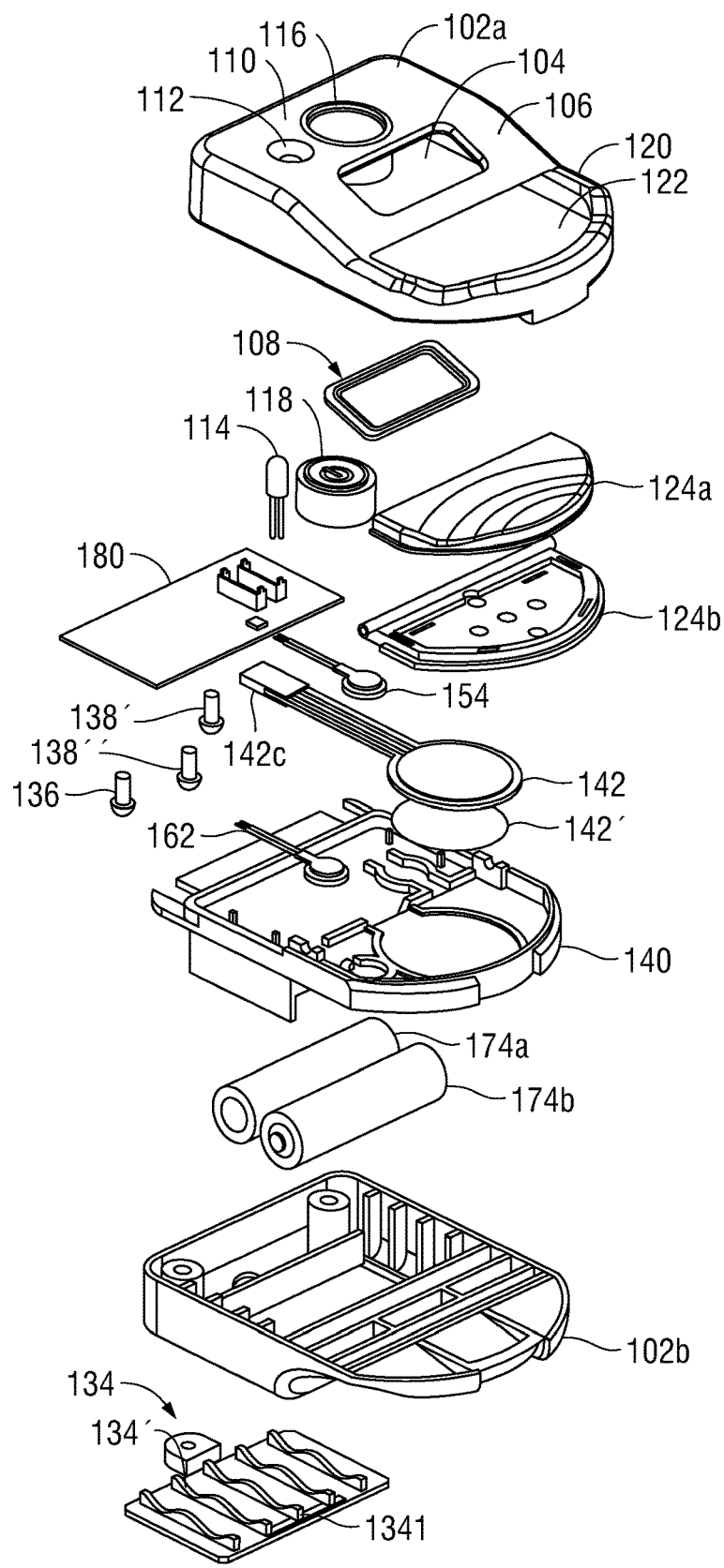
FIG. 5 is an exploded view of the internal contents of the force dynamometer.

Referring to both FIG. 2B and FIG. 2C, the first or upper compression plate 124a may be positioned over and in contact with a generally flat but flexible second or lower compression plate 124b that defines a lateral edge 132 with respect to the depression 124a' and curved profile of the compression plate 124a and is adjoined by a raised portion 132' such that upon a user exerting force on the first or upper compression plate 124a via a finger inserted in the depression 124a' and curved profile, the second or lower compression plate 124b then pivots or cantilevers around the lateral edge 132 and raised portion 132' such that the lateral edge 132 and raised portion then serve as a pivot axis for the second or lower compression plate 124b. The second or lower compression plate 124b is positioned over and in direct contact with a circular force sensing resistor 142 which, as illustrated in FIGS. 4 and 5, has a paddle shaped configuration with a circular force sensing region 142a, a rectangular circuit region 142b and an electrical contact 142c each in electrical communication with the other. Such force sensing resistors are available, for example:

http://www.cubbison.com/flexible-electronics/printed-force-sensitive-resistors/printed-force-sensitive-resistors available from Cubbison Co., Youngstown, Ohio, USA.

https://www.tekscan.com/product-group/test-measurement/force-measurement?tab=products-solutions available from Tekscan, Inc., South Boston, Mass., USA.

https://www.digikey.com/en/product-highlight/i/interlink/fsr-402-round-force-sensing-resistor available from Interlink Electronics.

A layer 142' of adhesive material is positioned under the circular portion of the force sensing resistor 142 to secure the resistor 142 to the supporting structure 140.

In an aspect of the present disclosure, only one compression plate, e.g., lower or second compression plate 124b may be installed within the supporting structure 140 and the upper or first compression plate 124a may be omitted such that a user would thereby exert force only on the lower or second compression plate 124b and the depression 128' formed by the curved or U-shaped profile of bottom cover base surface 128 of the bottom cover 102b.

In addition, with respect to both the upper or first compression plate 124a and the lower or second compression plate 124b, both plates may be flexible or one plate may be rigid and the other flexible depending upon the desired design parameters for application of the force dynamometer 100.

Figure 3A:
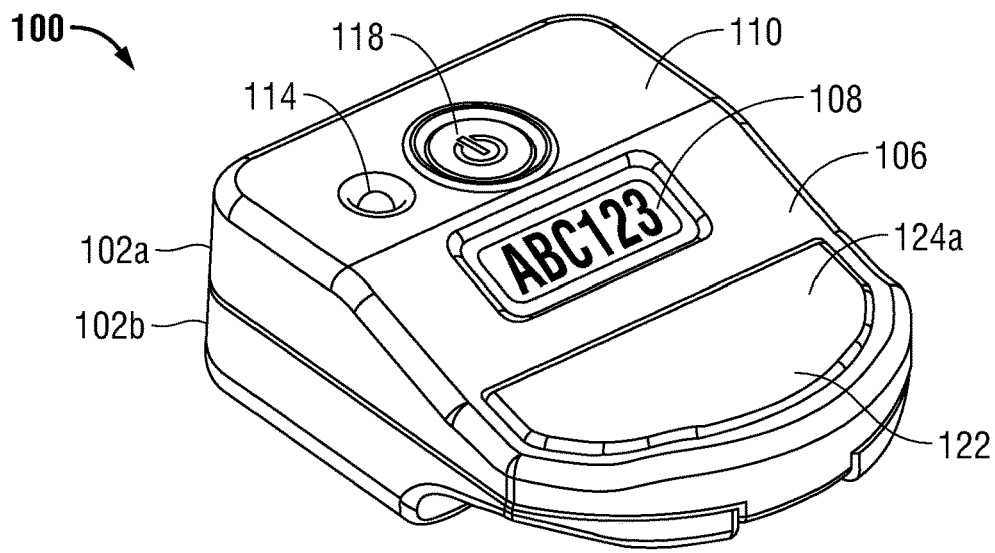
FIG. 3A is another front perspective view of the force dynamometer and illustrating a light-emitting diode (LED) and operating switch or button and a liquid crystal display (LCD)
Figure 3B:
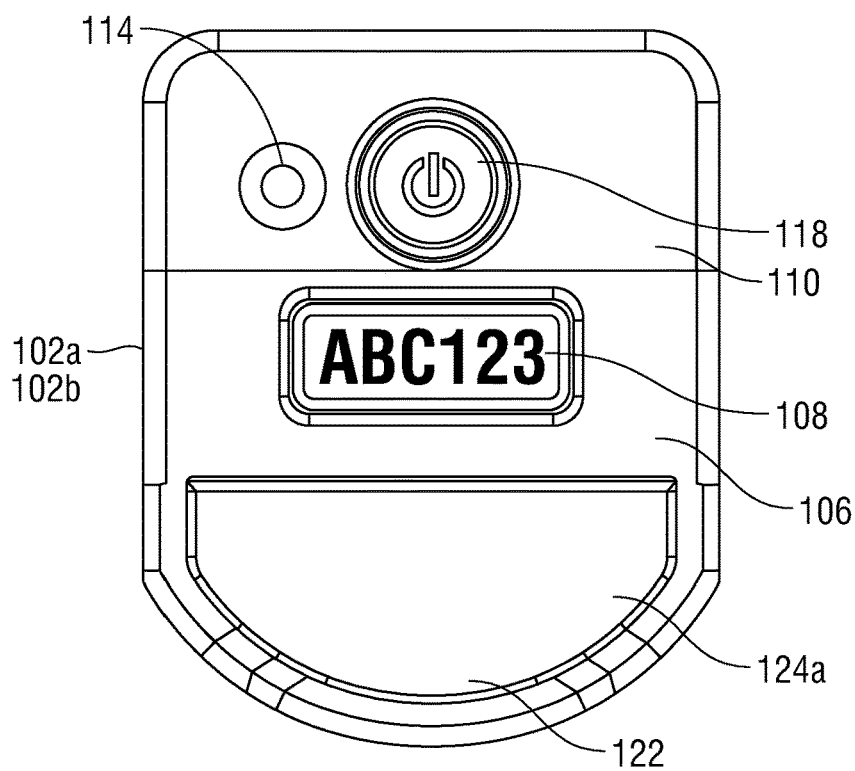
FIG. 3B is a direct plan view of the force dynamometer as shown in FIG. 3A.

Referring now to FIGS. 3A-3D there is illustrated additional views of the force dynamometer 100 as illustrated in FIGS. 1A-1D. FIG. 3A is another front perspective view of the force dynamometer 100 illustrating the LED 114 and operating switch or button 118 on the surface 110 of the top cover or enclosure 102a, the LCD 108 on the sloped surface 106 and the first or upper compression plate 124a through the first or upper compression plate aperture 122. FIG. 3B is a direct plan view of the force dynamometer 100 as shown in FIG. 3A.

Figure 3C:
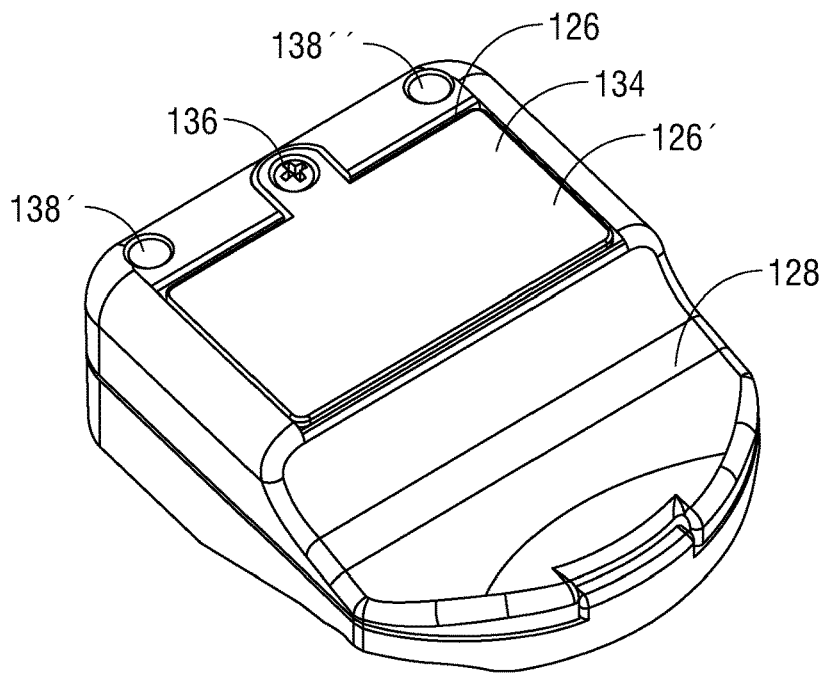
FIG. 3C is a front perspective views of the force dynamometer in an inverted position thereby illustrating the bottom cover or enclosure.
Figure 3D:
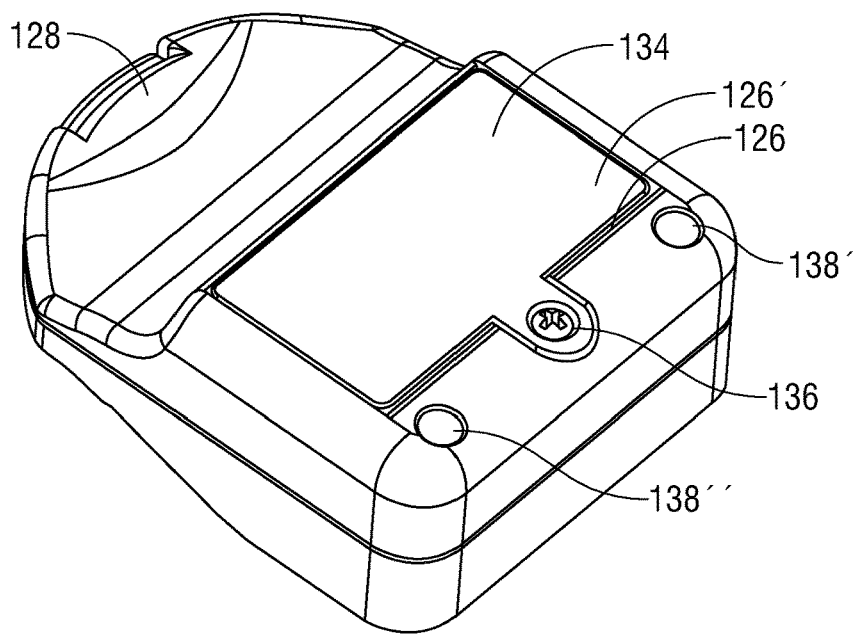
FIG. 3D is a rear perspective views of the force dynamometer in an inverted position thereby illustrating the bottom cover or enclosure.

FIGS. 3C and 3D are perspective views of the force dynamometer 100 in an inverted position thereby illustrating depressed surface 126 of bottom cover 102*b* and bottom cover base surface 128. Battery cover 134 is illustrated having as an example a rectangular shape and inserted into an aperture 126' defined in depressed surface 126 of bottom cover 102*b*. The battery cover 134 includes a fastening mechanism 136 such as a screw that is illustrated or other means in the art. The bottom cover 102*b* also includes fastening mechanisms 138' and 138", also illustrated as screws or other means in the art, at corners of the bottom cover or enclosure 102*b* that enable fastening to the top cover or enclosure 102*a*.

Referring now to FIG. 4 in conjunction with FIG. 5, in FIG. 4 there is illustrated the supporting structure 140, described above with respect to FIGS. 2B and 2C, also having an arch-shaped profile to facilitate interfacing with the arch-shaped profiles of the top cover or enclosure 102*a* and the bottom cover 102*b*.

Referring to FIG. 4, the upper surface of the supporting structure 140 is configured with a corresponding circular-shaped depression 144 that receives the circular force sensing region 142*a* and with a corresponding rectangular depression segment 146 that receives a portion of the rectangular circuit region 142*b* that extends directly from the circular force sensing region 142*a*. The circular-shaped depression 144 is formed by a circular perimeter wall 144' that includes a gap 148 wherein the circular perimeter wall 144' extends to interface with parallel interfacing walls 146' that define the rectangular depression segment 146.

The upper surface of the supporting structure 140 is configured with a rectangular-shaped depression region 150 that receives the rectangular circuit region 142*b* and the electrical contact 142*c* of the force sensing resistor 142.

As previously indicated above, force dynamometer 100 includes top cover or enclosure 102*a* and bottom cover or enclosure 102*b*, each having as an example an arch-shaped profile that is configured to interface with the arch-shaped profile of the other. Accordingly, the supporting structure 140 also defines an arch-shaped profile to facilitate interfacing with the arch-shaped profiles of top cover or enclosure 102*a* and of bottom cover 102*b*. The circular perimeter wall 144' that defines the circular depression 144 and the circular-shaped depression 144 then reside within an arch-shaped depression 152 that is defined by the arch-shaped portion 152' of perimeter wall 154 of the supporting structure 140.

A circular portion 156*a* of a first paddle-shaped piezoelectric sensor 156 then resides within a circular depression 158 defined by circular perimeter wall 158' both of which residing within the arch-shaped depression 152. In a generally similar manner as with respect to force sensing resistor 142, the circular perimeter wall 158' defines a gap 160 wherein a rectangular electrical circuit portion 156*b* of the piezoelectric sensor 156 extends into the rectangular-shaped depression region 150 that receives the rectangular circuit region 156*b* and that terminates as electrical contacts 156*c* of the first piezoelectric sensor 156 within the depression region 150.

In an aspect of the present disclosure, a second paddle-shaped piezoelectric sensor 162 of which a circular portion 162*a* may reside within a circular depression 164 formed between first and second winged parabolic perimeter walls 1641' and 1642' that define a first winged section 1661 forming a rectangular depression extending from the circular depression 164 through a gap 168 towards the arch-shaped depression 152 that is defined by the arch-shaped portion 152' of perimeter wall 154 of the supporting structure 140 and a second winged section 1662 that extends in the opposing direction away from the circular depression 164 to enable a rectangular circuit region 162*b* of the circular portion 162*a* to extend into the depression 150 to form electrical contacts 162*c* on the upper surface of the supporting structure 140 that extends over a rear portion of the bottom cover or enclosure 102*b*.

Returning to FIG. 2C, the first or upper compression plate 124*a* and the second or lower compression plate 124*b* thus are inserted within the arch-shaped depression 152 that is defined by the arch-shaped portion 152' of perimeter wall 154 of the supporting structure 140.

Referring also to the exploded view of FIG. 5, the force dynamometer 100 includes a printed circuit board or controller 180 that is positioned within the rectangular-shaped depression region 150 and over the rectangular circuit region 142*b* of the force sensing resistor 142 to establish electrical communication with the electrical contact 142*c* of the force sensing resistor 142. In addition, the printed circuit board or controller 180 is positioned within the rectangular-shaped depression region 150 also over the electrical contacts 156*c* of the first piezoelectric sensor 156 and over the electrical contacts 162*c* of the second piezoelectric sensor 162 to establish electrical communication with the first piezoelectric sensor 156 and with the second piezoelectric sensor 162, respectively.

The controller 180 includes an inertial measurement unit (IMU) (not explicitly shown). As illustrated in FIG. 2C, the force sensing resistor 142 is mounted in operable association with the first or upper compression plate 124*a* and the second or lower compression plate 124*b*, and more particularly may be mounted beneath the second or lower compression plate 124*b*, and as illustrated in FIG. 5, in electrical communication with the controller 180 and the inertial measurement unit.

Returning to FIG. 4, the supporting structure 140 defines at left and right corners 172*a* and 172*b* that are distal from the portion 152' of perimeter wall 154 of the supporting structure 140 respectively U-shaped apertures that enable receiving therethrough the fastening means 138' and 138" that secure the bottom cover or enclosure 102*b* to the top cover or enclosure 102*a*.

As illustrated in FIG. 5, as known in the art, the inner surface 134' of battery cover 134 is configured with a series of supports 1341 that are configured to receive and support cylindrically shaped batteries 174*a* and 174*b* when the battery cover 134 is removed from the closed position. The batteries 174*a* and 174*b* are shown for example as standard cylindrical type batteries but may be any other type of power source including other types of batteries or one or more supercapacitors suitable for the application to establish electrical communication with electrically operated components which include the printed circuit board or controller 180, the force sensing resistor 142, the piezoelectric sensors 154 and 162, the LCD 108 and the LED 114. The force dynamometer 100 may require a degree of modification to accommodate such alternate power sources but operationally would fall within the scope of the present disclosure.

As can be appreciated from the foregoing, the force dynamometer 100 includes at least one plate, e.g., first or upper compression plate 124*a* and/or the second or lower compression plate 124*b*, the printed circuit board or controller 180 that includes a memory storing instructions, and at least one force sensing resistor 142 that is mounted in operable association with the one or more plates, e.g., first or upper compression plate 124*a* and/or the second or lower compression plate 124*b*, and in electrical communication with the printed circuit board or controller 180 such that the one or more force sensing resistors, e.g., force sensing resistor 142, senses a force exerted on the one or more plates, e.g., first or upper compression plate 124a and/or the second or lower compression plate 124b. The printed circuit board or controller 180 receives a signal from the one or more force sensing resistors, e.g., force sensing resistor 142, indicating magnitude of the force sensed by the one or more force sensing resistors, e.g., force sensing resistor 142.

The printed circuit board or controller 180 transmits a signal to at least one color variable light emitting diode (LED), e.g., LED 114, that is in electrical communication with the one or more force sensing resistors, e.g., force sensing resistor 142, and in electrical communication with the printed circuit board or controller 180 to receive the force signal therefrom to change color of the one or more color variable LEDs, e.g., LED 114, in response to the one or more force sensing resistors, e.g., force sensing resistor 142, changing magnitude of the force signal transmitted to the printed circuit board or controller 180.

Alternatively, or additionally, the printed circuit board or controller 180 transmits a signal to one or more piezoelectric sensors, e.g., piezoelectric sensor 156 and/or piezoelectric sensor 162 in electrical communication with the one or more force sensing resistors, e.g., force sensing resistor 142, via the printed circuit board or controller 180 such that the printed circuit board or controller 180 controls intensity of vibrations and/or frequency of the vibrations of the one or more piezoelectric sensors, e.g., piezoelectric sensor 156 and/or piezoelectric sensor 162. Thereby, various combinations of controlling by the printed circuit board or controller 180 of the one or more LEDs, e.g., LED 114, and the one or more piezoelectric sensors, e.g., piezoelectric sensor 156 and/or piezoelectric sensor 162, are possible.

In an aspect of the present disclosure, wherein the one or more color variable light emitting diodes (LED), e.g., LED 114 is in electrical communication with the one or more piezoelectric sensors, e.g., first piezoelectric sensor 156 and second piezoelectric sensor 162, upon the printed circuit board or controller 180 sensing a force signal transmitted from the one or more piezoelectric sensors, e.g., first piezoelectric sensor 156 and second piezoelectric sensor 162, the printed circuit board or controller 180 causes the one or more piezoelectric sensors, e.g., first piezoelectric sensor 156 and second piezoelectric sensor 162, to change one of vibration intensity or vibration frequency or combinations of vibration intensity and vibration frequency and the the printed circuit board or controller 180 causes the one or more color variable LEDs, e.g., LED 114, to change color in response to the one or more piezoelectric sensors, e.g., first piezoelectric sensor 156 and second piezoelectric sensor 162, changing one of vibration intensity or vibration frequency or combinations of vibration intensity and vibration frequency.

Figure 6A:
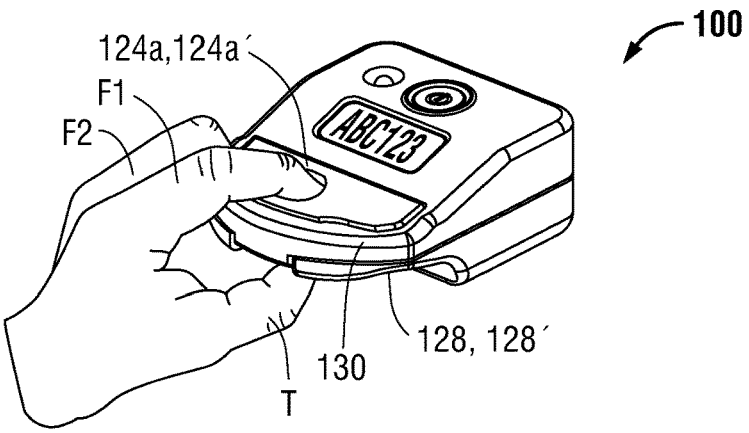
FIG. 6A illustrates s way in which a user may hold the force dynamometer and apply force via the finger squeeze interface.
Figure 6B:
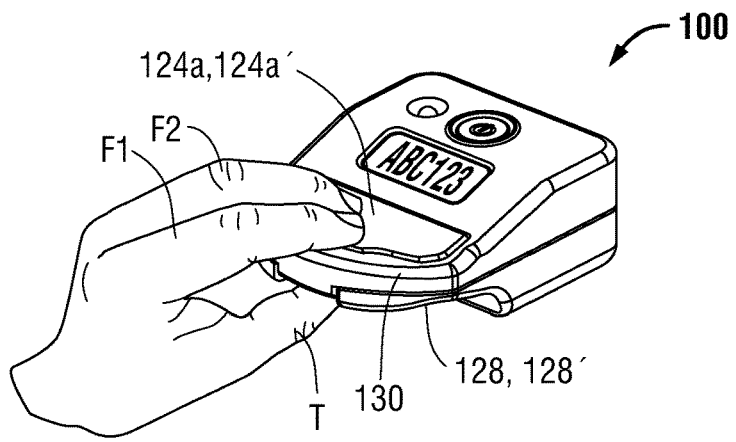
FIG. 6B illustrates another way in which a user may hold the force dynamometer and apply force via the finger squeeze interface.
Figure 6C:
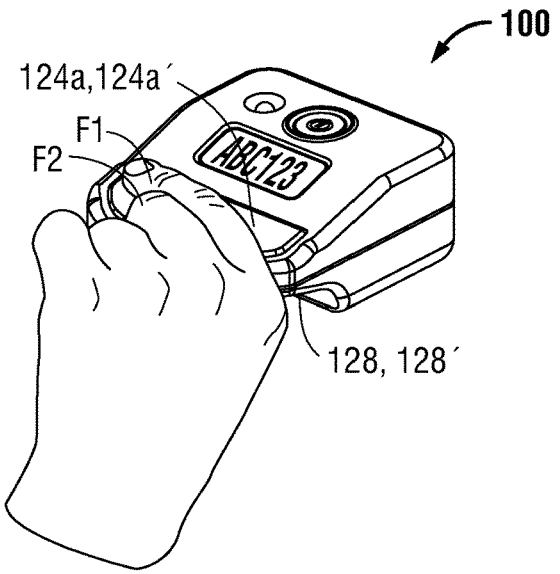
FIG. 6C illustrates yet another way in which a user may hold the force dynamometer and apply force via the finger squeeze interface.

FIGS. 6A-6C illustrate different ways in which a user may hold the force dynamometer 100 and apply force via the finger squeeze interface 130. More particularly, in FIG. 6A, a user is applying index finger F1 generally orthogonally to the depression 124a' formed by the curved profile of first or upper compression plate 124a while also applying thumb T to the depression 128' formed by the curved profile of bottom cover base surface 128.

In FIG. 6B, a user is applying both index finger F1 and middle finger F2 generally orthogonally to the depression 124a' formed by the curved profile of first or upper compression plate 124a while also applying thumb T to the depression 128' formed by the curved profile of bottom cover base surface 128.

In FIG. 6C, a user is applying index finger F1 generally aligned with and parallel to the depression 124a' formed by the curved profile of first or upper compression plate 124a while also applying thumb T to the depression 128' formed by the curved profile of bottom cover base surface 128.

Figure 7A:
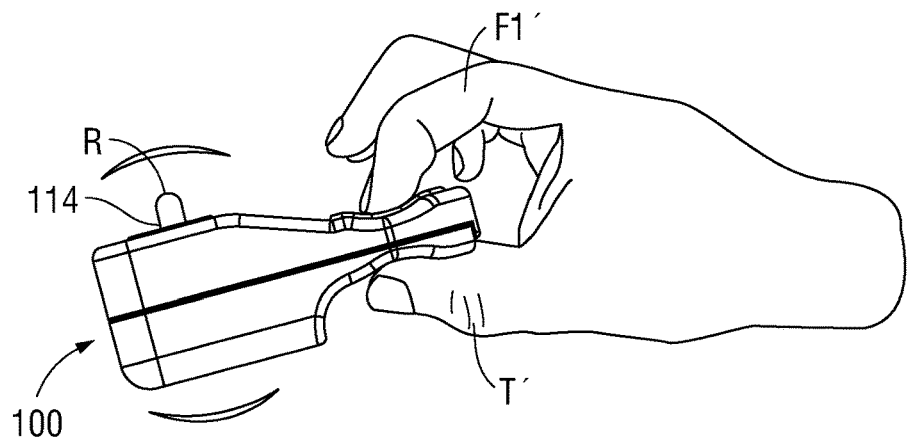
FIG. 7A is a profile view of the force dynamometer wherein a user is applying a thumb and an index finger generally orthogonally to cause emission of red light from the color variable LED.
Figure 7B:
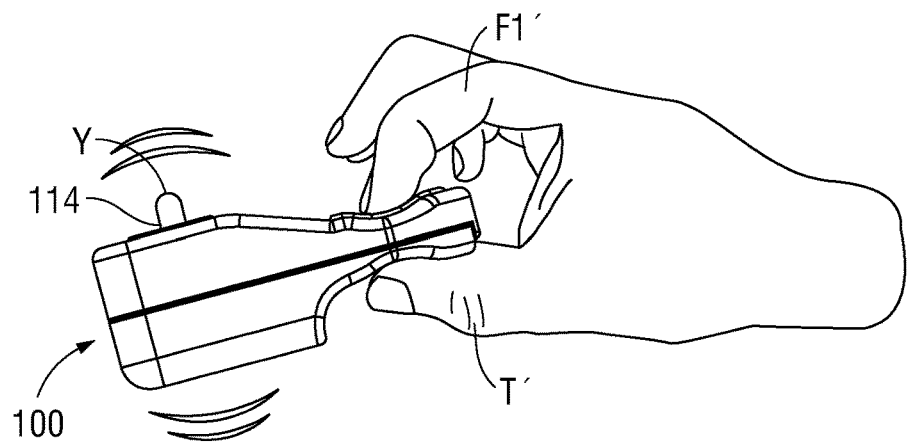
FIG. 7B is a profile view of the force dynamometer wherein a user is applying a thumb and an index finger generally orthogonally to cause emission of yellow light from the color variable LED.
Figure 7C:
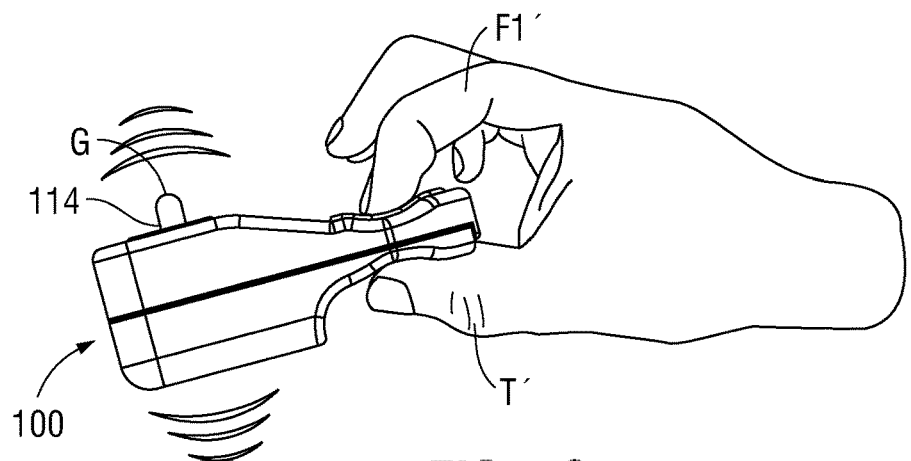
FIG. 7C is a profile view of the force dynamometer wherein a user is applying a thumb and an index finger generally orthogonally to cause emission of green light from the color variable LED.

FIGS. 7A-7C are profile views of the force dynamometer 100 wherein a user is applying a thumb T and an index finger F1' generally orthogonally to cause changes in color of the color variable LED 114.

More particularly, in FIG. 7A, a user is applying index finger F1' generally orthogonally to the depression 124a' formed by the curved profile of first or upper compression plate 124a while also applying thumb T' to the depression 128' formed by the curved profile of bottom cover base surface 128 so as to exert force to cause LED 114 to emit red light R.

In a similar manner, in FIG. 7B, a user is exerting a different force level or intensity to cause LED 114 to emit yellow light Y, thereby the change in force intensity causing a change in the color of emitted light from the LED.

In FIG. 7C, a user is exerting another force level or intensity to cause LED 114 to emit green light G, thereby the change in force intensity again causing a change in the color of emitted light from the LED.

Figure 8:
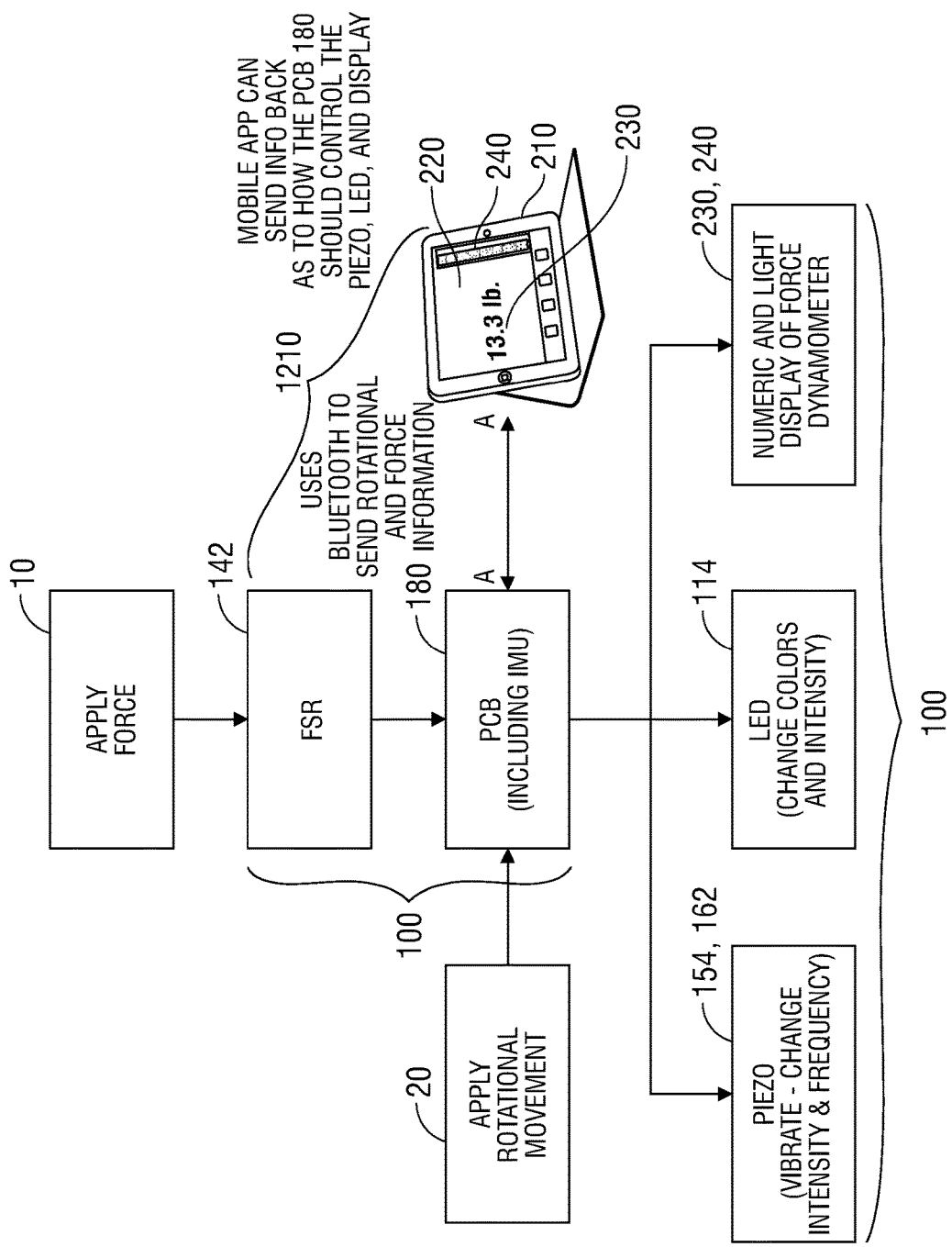
FIG. 8 is a schematic combined method diagram and circuit flow diagram of a force dynamometer system and method of operating the system according to an aspect of the present disclosure.

FIG. 8 is a schematic combined method diagram and circuit flow diagram of a force dynamometer system and method of operating the system according to an aspect of the present disclosure.

Figure 9:
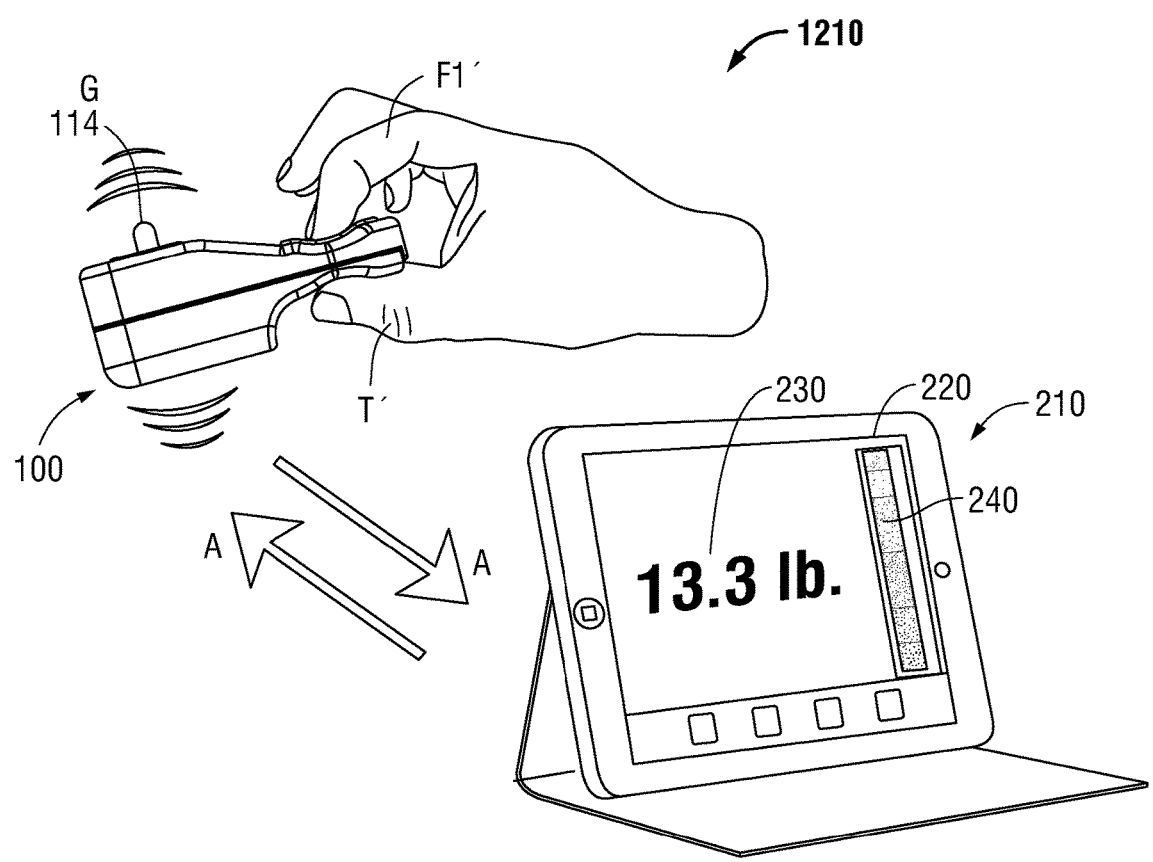
FIG. 9 is a physical drawing of the force dynamometer system of FIG. 8 according to an aspect of the present disclosure wherein a user is applying force via a finger and a thumb to the force dynamometer to operate the system to display the torque value applied on a display.

FIG. 9 is a physical drawing of force dynamometer system 1210 wherein a user is applying force via finger F1' and thumb T' to the force dynamometer 100 to operate the system 1210.

Referring to both FIG. 8 and FIG. 9, more particularly, force dynamometer system 1210 includes the force dynamometer 100 wherein the printed circuit board or controller 180 includes therein an inertial measurement unit (IMU) as described above with respect to FIG. 5.

The force dynamometer system 1210 further includes a computing device 210 that includes therein at least one processor and a memory storing instructions which, when executed by the processor, causes the computing device 210 to display a variable color or color intensity image in relation to the intensity of force applied to the force dynamometer 100 by a user. The PCB or controller 180 of the force dynamometer 100 is in electrical communication with the computing device 210 and generally communication between the controller 180 and the computing device 210 is bi-directionally wireless using protocols such as Bluetooth, etc, as shown by double arrow A-A. The force applied by the user to the force dynamometer 100 in step 10 is illustrated for example as causing LED 114 to emit green light G and the variable numerical data is illustrated on display 220 as a force reading 230, for example "13.3 lb." as shown, which is variable and which is then represented by a color scale 240.

Color scale 240 may be configured as an example to emit green light representing a light force being applied, orange light representing a medium-light force being applied, red light representing a medium force being applied, purple light representing a medium hard force and blue light representing a hard force being applied. The computing device 210 may be programmed with other colors and color combinations and different numerical force ranges applying to the definitions of light, medium-light, medium, medium-hard and hard, etc., as desired.

Alternatively, or additionally, the force applied in step 10 may cause the first and/or second piezoelectric sensors 154 and 162 to change in vibration intensity and/or frequency.

In step 20, a user may apply rotational movement to the force sensing dynamometer which may cause rotation of an image on display 220 or of an object, and thereby change in orientation, such that the force dynamometer system 1210 causes the computing device 210 that includes therein at least one processor and a memory storing instructions which, when executed by the processor to control speed of a variable motion speed controllable image or object, or to display a direction controllable image or object or to control a direction controllable image or object, or to display combinations of a variable motion speed image or object and a direction controllable image or object or to control a direction controllable image or object.

The controller 180 of the force dynamometer 100 includes an inertial measurement unit and at least one force sensing resistor 142 in electrical communication with the controller 180 and the inertial measurement unit, wherein upon the controller 180 sensing a force signal transmitted from the force sensing resistor 142 and the inertial measurement unit sensing via the inertial measurement unit motion or movement of a variable motion speed image or object, or direction of a direction controllable image or object, or combinations of a motion or movement of a variable motion speed image or object and a direction of a direction controllable image or object, upon a user increasing or decreasing force applied to the force dynamometer 100, the controller 180 transmits a signal to the processor 210 to vary speed of the variable motion speed image or object or to vary direction of the direction controllable image or object, or a combination of varying speed of the variable motion speed image or object or varying direction of the direction controllable image or object.

Alternatively, upon a user varying orientation of the force dynamometer 100, the controller 180 transmits a signal to the processor 210 to vary orientation of the direction controllable image or object.

If a reference line such as the linear edge of the lower or second compression plate 124*b* and a center of pressure can be identified, then the force dynamometer 100 can be modified so that torque could be calculated based on the distance between the reference line and the center of pressure and a calculation of the force based on the pressure and the area being squeezed at the finger squeeze interface 130. In some cases, the center of pressure may coincide with the center of the finger squeeze interface 130 represented by dashed line 130' through the lowest point of depression 124*a*' and highest point of depression 128', as described above with respect to FIG. 2C.

Figure 10A:
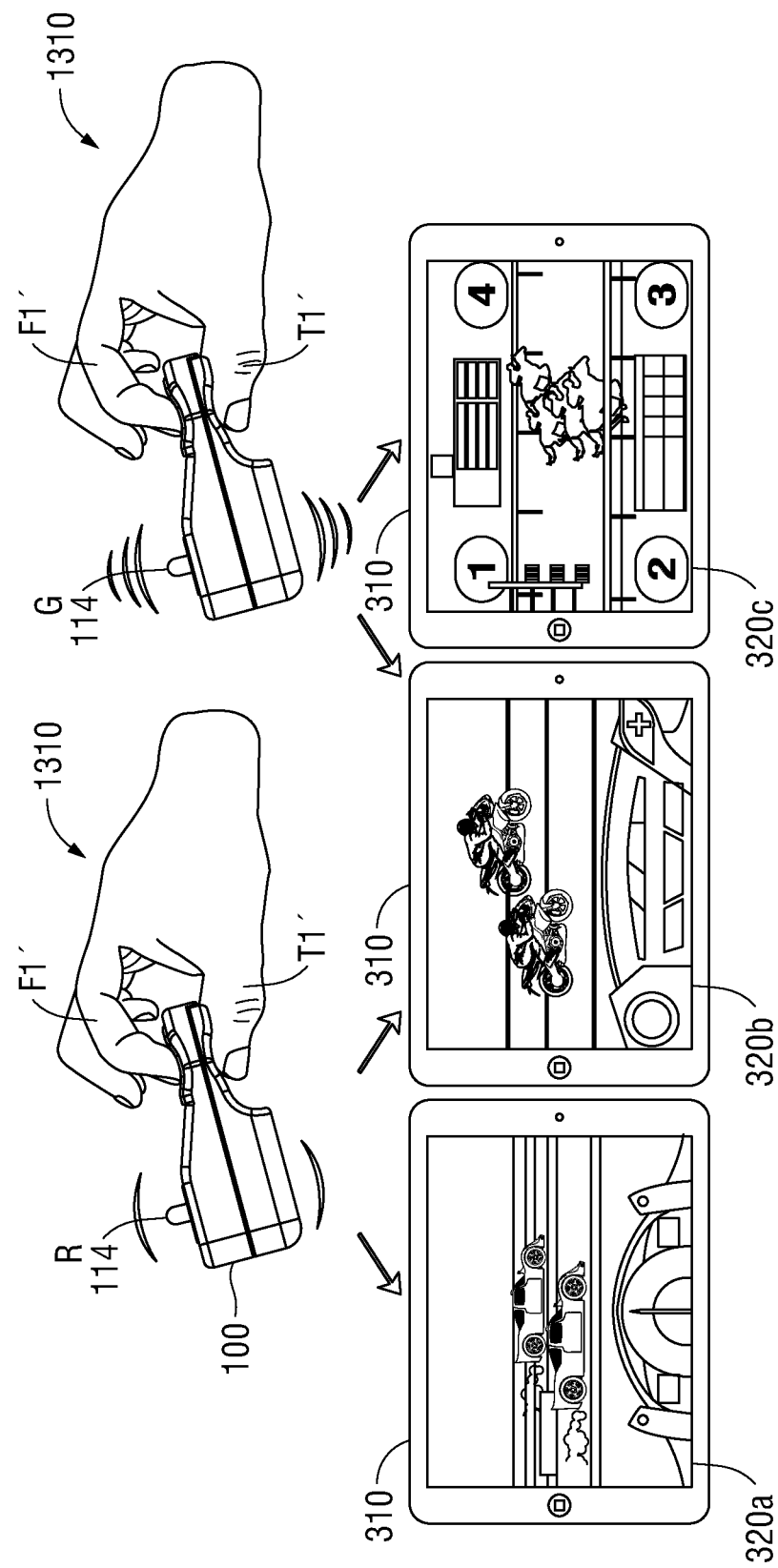
FIG. 10A illustrates an aspect of the force dynamometer system of FIGS. 8 and 9 according to the present disclosure wherein the force dynamometer is utilized by a user to control a race car video game, a motorcycle video game and a horse racing video game.
Figure 10B:
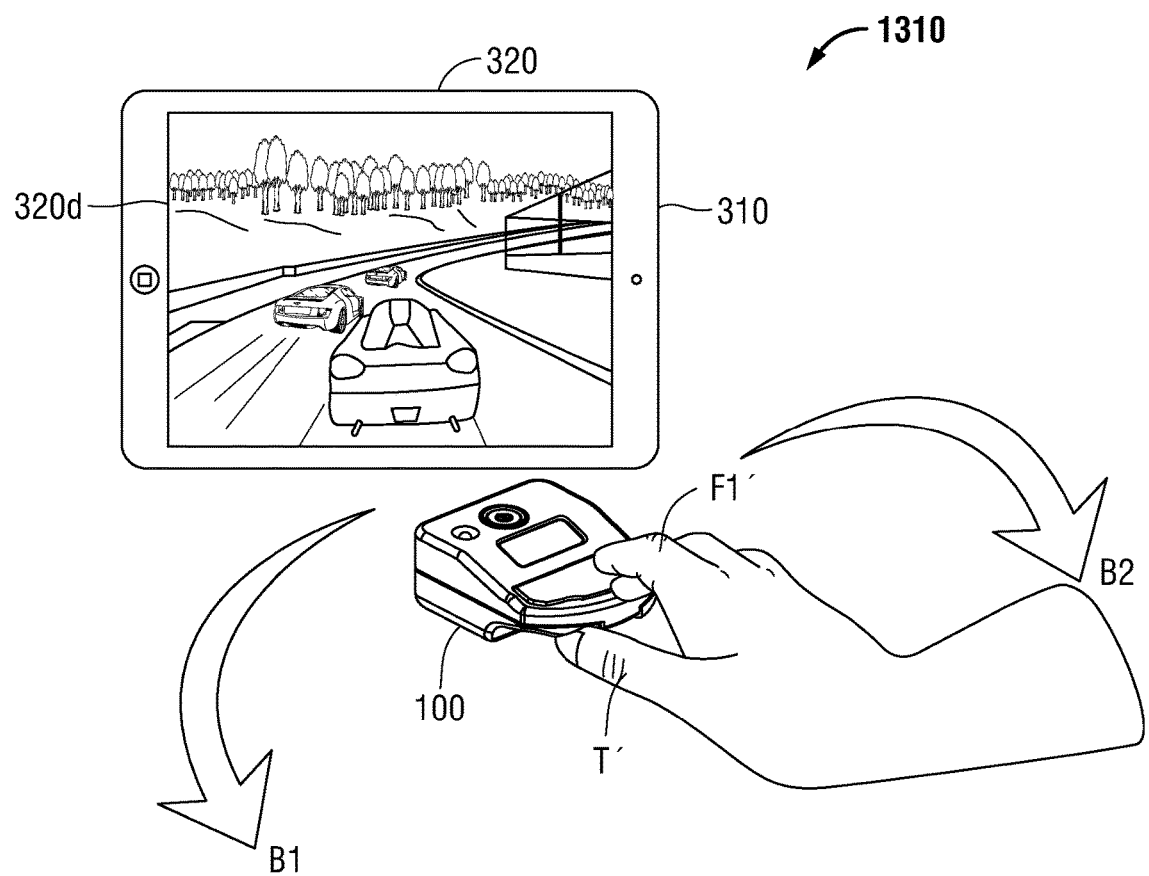
FIG. 10B illustrates the force dynamometer system of FIG. 10A wherein the force dynamometer is utilized by a user to control the steering of a race car in a race car video game.

FIGS. 10A-10B illustrate an aspect of a force dynamometer system according to the present disclosure wherein force dynamometer system 1310 includes the force dynamometer 100 wherein the printed circuit board or controller 180 again includes therein an inertial measurement unit (IMU) as described above with respect to FIG. 5.

The force dynamometer system 1310 further includes a computing device 310 that includes therein at least one processor and a memory storing instructions which, when executed by the processor, causes the computing device 310 to display and/or to control speed of a variable motion speed controllable image 320*a* or 320*b* or 320*c* or object, or to display and/or control a direction controllable image, which again may be represented by images 320*a* or 320*b* or 320*c*, or object or to control a direction controllable image or object, or to display combinations of a variable motion speed image or object and a direction controllable image or object or to control a direction controllable image or object in relation to the intensity of force applied to the force dynamometer 100 by a user.

The computing device 310 is analogous to computing device 210 illustrated and described above with respect to FIGS. 8 and 9 and both are interchangeable with respect to the force dynamometer 100. Display 320*a* illustrates a The controller 180 of the force dynamometer 100 is in electrical communication with the computing device 310 and generally communication between the controller 180 and the computing device 310 is bi-directionally wireless using protocols such as Bluetooth, etc.

In the left panel of FIG. 10A, a user is applying finger F1' and thumb T' to the force dynamometer 100 to control display 320*a* of a racing car game to control the speed of the cars as described above with respect to FIG. 8. The force causes the LED 114 to emit red light R.

In the center panel, the user is now using the force dynamometer 100 to control display 320*b* of a motorcycle racing game. The force causes the LED 114 to emit first red light R and then variation of the force causes the LED 114 to emit green light G.

In the right panel, the user is now using the force dynamometer 100 to control display 320*c* of a horse racing game. The force causes the LED 114 to emit green light G.

In each of the panels, the piezoelectric sensors 154 and 162 may also be operated or caused by the display images to be operated to increase or decrease intensity and/or frequency of vibrations.

In FIG. 10B, the user is now using the force dynamometer 100 to control display 320*d* of another racing car game wherein the user is causing the racing cars to be steered to the left per arrow B1 or to the right per arrow B2 by rotating the orientation of the force dynamometer 100.

Although not explicitly shown, the force dynamometer system 1310 may be configured to enable more than one user each having his or her own force dynamometer 100 to control the display images.

Figure 11:
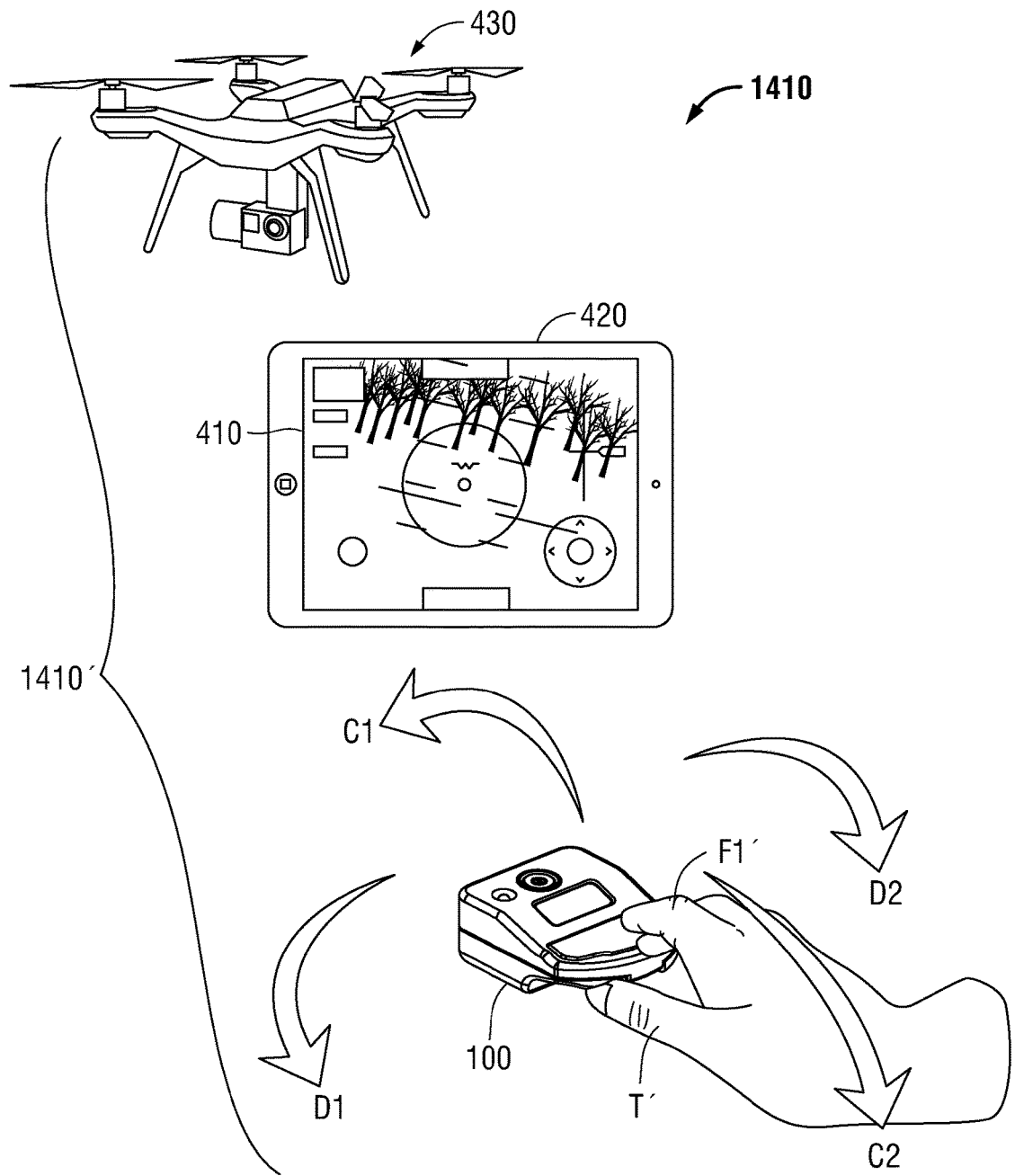
FIG. 11 illustrates an aspect of the force dynamometer system of FIGS. 8 and 9 according to the present disclosure wherein the force dynamometer system is utilized by a user to control a display of an aerial drone and thereby to control the drone.

FIG. 11 illustrates an aspect of a force dynamometer system according to the present disclosure wherein force dynamometer system 1410 includes the force dynamometer 100 wherein the printed circuit board or controller 180 again includes therein an inertial measurement unit (IMU) as described above with respect to FIG. 5.

In a similar manner as described previously, computing device 410 is analogous to computing devices 210 and 310 illustrated and described above with respect to FIGS. 8 and 9 and FIGS. 10A-10B and each one is interchangeable with respect to the force dynamometer 100. Display 420 illustrates an image of an object being controlled and the background scenery of the location. The controller 180 of the force dynamometer 100 is in electrical communication with the computing device 410 and again generally communication between the controller 180 and the computing device 410 is bi-directionally wireless using protocols such as Bluetooth, etc.

The computing device 410 includes therein at least one processor and a memory storing instructions which, when executed by the processor, causes the computing device 410 to display and/or to control speed of a variable motion speed controllable image 420 and an object 430, e.g., an airborne drone in the example illustrated, or to display and/or control a direction controllable image, which again may be represented by image 420, or object 430, again e.g. the airborne drone in the example illustrated, or to control a direction controllable image or object, or to display combinations of a variable motion speed image or object and a direction controllable image or object or to control a direction controllable image or object in relation to the intensity of force applied to the force dynamometer 100 by a user.

More particularly, with respect to image 420 and object 430, the user may tilt or lean the force dynamometer 100 in a forward downward slant in the direction of arrow C1 and the drone representing object 430 will move forward away from the user.

The user may also tilt or lean the force dynamometer 100 backwards in an upward rear slant in the direction of arrow C2 and the drone representing object 430 will move rearward toward the user.

The user may rotate the force dynamometer 100 so the left side moves downward in the direction of arrow D1 and conversely rotate the force dynamometer 100 so the right side moves downward in the direction of arrow D2. The user may also press the force dynamometer 100 and the drone representing object 430 can move vertically upward. The greater the force applied at the finger squeeze interface 130 (see FIG. 2C), the greater the speed of the drone motor so the greater the altitude and vertical velocity of the drone 430. Conversely, the less force applied at the finger squeeze interface 130, the lower the speed of the drone motor so the lower the altitude and vertical velocity of the drone 430. The drone 430 may be maintained at a constant altitude by maintaining a constant pressure at the finger squeeze interface 130.

Figure 12:
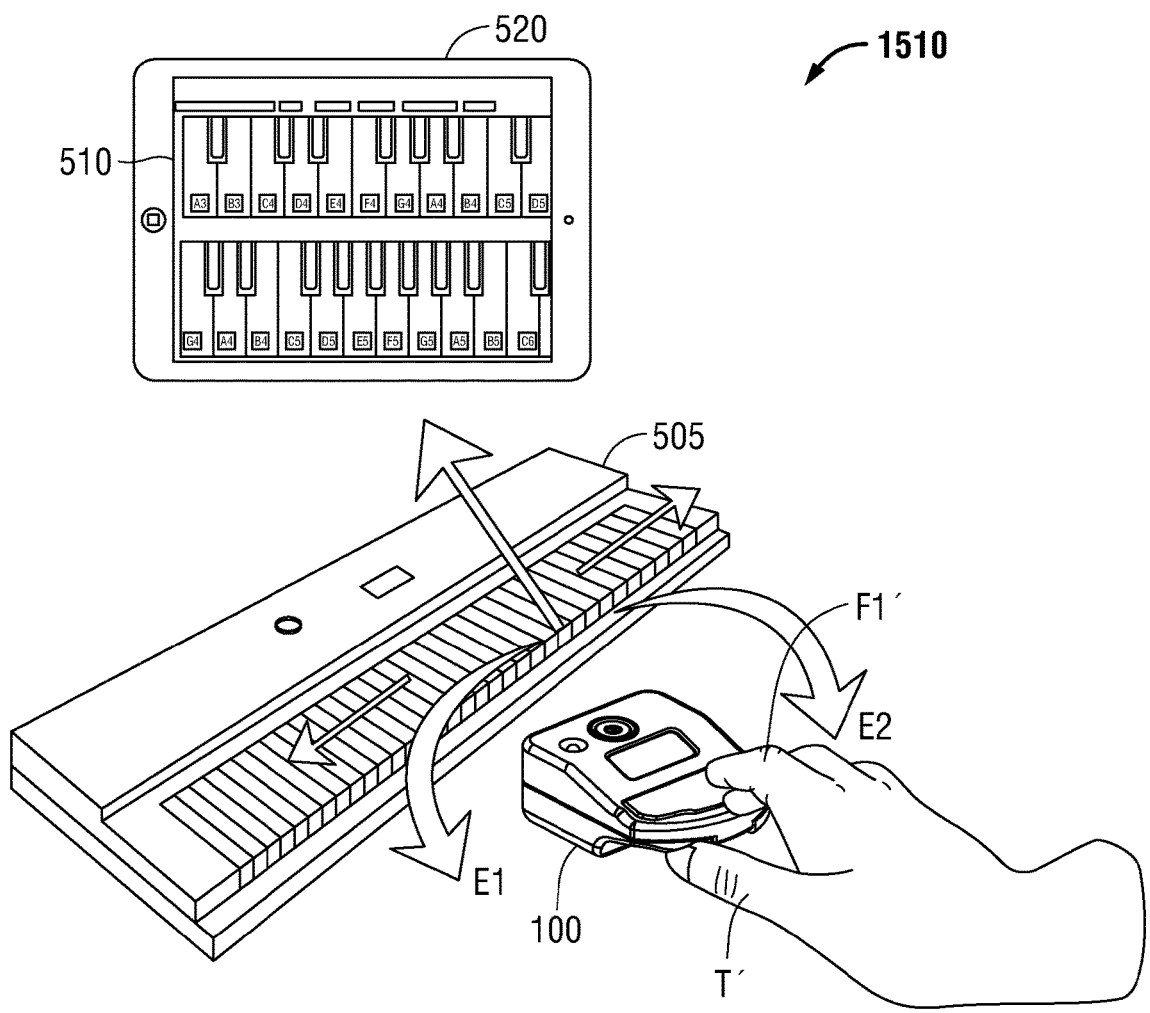
FIG. 12 illustrates an aspect of the force dynamometer system of FIGS. 8 and 9 according to the present disclosure wherein the force dynamometer system is utilized by a user to control playing of a virtual musical instrument.

FIG. 12 illustrates an aspect of a force dynamometer system according to the present disclosure wherein force dynamometer system 1510 includes the force dynamometer 100 wherein the printed circuit board or controller 180 again includes therein an inertial measurement unit (IMU) as described above with respect to FIG. 5.

In a similar manner as described previously, computing device 510 is analogous to computing devices 210, 310 and 410 illustrated and described above with respect to FIG. 8, FIG. 9, FIGS. 10A-10B and FIG. 11 and each one is interchangeable with respect to the force dynamometer 100. Display 520 illustrates an image of an object being controlled, e.g., an image of a virtual musical instrument that represents a reference musical instrument 505 such as a keyboard that is not physically present in the force dynamometer system 1510. The controller 180 of the force dynamometer 100 is in electrical communication with the computing device 510 and again generally communication between the controller 180 and the computing device 510 is bi-directionally wireless using protocols such as Bluetooth, etc.

The computing device 510 includes therein at least one processor and a memory storing instructions which, when executed by the processor, causes the computing device 510 to display and/or to control which note is to be played, note velocity (audio intensity or loudness) and pitch and of the variable musical note controllable image 520 e.g., a virtual piano in the example illustrated, or to display and/or control a direction controllable image, which again may be represented by image 520 again e.g. the virtual musical instrument such as the virtual piano in the example illustrated wherein the force dynamometer 100 enables the user to move a virtual finger of the user along the keyboard of the virtual piano to select the desired note, or to display combinations of a variable motion speed image or object and a direction controllable image or object or to control a direction controllable image or object in relation to the intensity of force applied to the force dynamometer 100 by a user.

More particularly, with respect to image 520, the user may tilt or lean the force dynamometer 100 in a sideways slant to the left in the direction of arrow C1 and the virtual finger can move to the left to play a different note by then exerting a force on the force dynamometer 100.

Similarly, the user may tilt or lean the force dynamometer 100 in a sideways slant to the right in the direction of arrow C2 and the virtual finger can move to the right to play a different note by then exerting a force on the force dynamometer 100.

Although the present disclosure has been described in considerable detail with reference to certain embodiments, other embodiments and versions are possible and contemplated. Therefore, the spirit and scope of the appended claims should not be limited to the description of the embodiments contained herein.

What is claimed is:

1. A force dynamometer comprising:
   at least one plate;
   a controller including a memory storing instructions;
   at least one force sensing resistor mounted in operable association with the at least one plate and in electrical communication with the controller such that the at least one force sensing resistor senses a force exerted on the at least one plate wherein the controller receives a signal from the at least one force sensing resistor indicating magnitude of the force sensed by the at least one force sensing resistor; and
   wherein the controller transmits a signal to at least one color variable light emitting diode (LED) that is in electrical communication with the at least one force sensing resistor and in electrical communication with the controller to receive the force signal therefrom to change color of the at least one color variable LED in response to the at least one force sensing resistor changing magnitude of the force signal transmitted to the controller,
   or wherein the controller transmits a signal to at least one piezoelectric sensor in electrical communication with the at least one force sensing resistor via the controller such that the controller controls intensity of vibrations or frequency of the vibrations of the at least one piezoelectric sensor or combinations of said controlling by the controller of the at least one LED and the at least one piezoelectric sensor.

2. The force dynamometer according to claim 1, wherein the at least one plate is flexible.

3. The force dynamometer according to claim 1, wherein the at least one plate includes a first plate and a second plate and the at least one force sensing resistor is mounted beneath the first plate and the second plate.

4. The force dynamometer according to claim 2, including a supporting structure; and
   an enclosure configured with a channel,
   wherein the at least one plate includes at least two plates supported by the supporting structure, one of the at least two plates configured with a channel, wherein the channel configured in the one of the at least two plates and the channel configured in the enclosure enable positioning by a user of the force dynamometer of a finger in one of the channels and a thumb in the other of the channels such that the user can move the finger and thumb towards one another to exert force on the force sensitive resistor.

5. The force dynamometer according to claim 1, comprising:

a liquid crystal display (LCD) in electrical communication with the controller, wherein upon the at least one force sensing resistor sensing a force, the controller transmits a signal to the LCD to display a magnitude of the force sensed by the at least one force sensing resistor.

6. The force dynamometer according to claim 5, wherein the controller is configured to transmit the pressure or force data point as one in a sequence of a plurality of pressure or force data points to a processor capable of storing and displaying the plurality of pressure or force data points.

7. The force dynamometer according to claim 4, wherein the channels are each configured as U-shaped channels thereby enabling positioning by a user of the force dynamometer of a finger and a thumb each in a respective U-shaped channel such that the user can move the finger and thumb to towards one another to exert force on the force sensitive resistor.

8. The force dynamometer according to claim 1, comprising:

wherein the at least one color variable light emitting diode (LED) is in electrical communication with the at least one piezoelectric sensor, wherein upon the controller sensing a force signal transmitted from the at least one piezoelectric sensor, the controller causes the at least one piezoelectric sensor to change one of vibration intensity or vibration frequency or combinations of vibration intensity and vibration frequency and wherein the controller causes the at least one color variable LED to change color in response to the at least one piezoelectric sensor changing one of vibration intensity or vibration frequency or combinations of vibration intensity and vibration frequency.

* * * * *